United States Patent
Anderson et al.

(10) Patent No.: US 11,804,717 B2
(45) Date of Patent: Oct. 31, 2023

(54) SYSTEMS AND METHODS FOR COORDINATING DISTRIBUTED ENERGY STORAGE

(71) Applicant: The Board of Trustees of the Leland Stanford Junior University, Stanford, CA (US)

(72) Inventors: Kyle Anderson, Stanford, CA (US); Abbas El Gamal, Palo Alto, CA (US); Ram Rajagopal, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 549 days.

(21) Appl. No.: 15/973,374

(22) Filed: May 7, 2018

(65) Prior Publication Data
US 2018/0358812 A1    Dec. 13, 2018

Related U.S. Application Data

(60) Provisional application No. 62/502,470, filed on May 5, 2017.

(51) Int. Cl.
  *G05B 15/02* (2006.01)
  *H02J 3/38* (2006.01)
  (Continued)

(52) U.S. Cl.
  CPC .............. *H02J 3/381* (2013.01); *G05B 15/02* (2013.01); *H02J 3/003* (2020.01); *H02J 3/32* (2013.01);
  (Continued)

(58) Field of Classification Search
  CPC ........ H02J 3/383; H02J 3/381; H02J 13/0013; H02J 3/32; H02J 2003/146; H02J 2003/003; G05B 15/02
  See application file for complete search history.

(56) References Cited

U.S. PATENT DOCUMENTS

| | | | |
|---|---|---|---|
| 2007/0124026 A1* | 5/2007 | Troxell | G06Q 30/08 700/291 |
| 2008/0195255 A1* | 8/2008 | Lutze | F03D 9/257 700/291 |

(Continued)

OTHER PUBLICATIONS

"Annual Energy Outlook 2014: with projections to 2040", U.S. Energy Information Administration: Independent Statistics and Analysis, Apr. 2014, 269 pgs.

(Continued)

*Primary Examiner* — Christopher E. Everett
*Assistant Examiner* — Marzia T Monty
(74) *Attorney, Agent, or Firm* — KPPB LLP

(57) ABSTRACT

Systems and methods for coordinating distributed energy storage in accordance with embodiments of the invention are illustrated. One embodiment includes a power distribution network, including a set of nodes, wherein a node includes a controllable load, an uncontrollable load, and a local controller, a substation connected to each node in the set of nodes by a set of distribution lines, and a global controller including a processor, a memory, and a communications device, wherein the global controller obtains load parameters from at least one node, calculates coordination parameters for each node based on the obtained load parameters, and asynchronously provides the coordination parameters to each of the nodes in the set of nodes, and wherein each node independently obtains coordination parameters, and controls the operation of its controllable load using the local controller based on the coordination parameters and a local load profile describing at least the uncontrollable load.

18 Claims, 22 Drawing Sheets

(51) Int. Cl.
  *H02J 3/32*    (2006.01)
  *H02J 3/00*    (2006.01)
  *H02J 3/46*    (2006.01)
  *H02J 13/00*   (2006.01)

(52) U.S. Cl.
  CPC .......... *H02J 3/46* (2013.01); *H02J 13/00006* (2020.01); *H02J 13/00034* (2020.01); *H02J 3/322* (2020.01); *H02J 2300/24* (2020.01); *H02J 2310/48* (2020.01); *H02J 2310/64* (2020.01)

(56) References Cited

U.S. PATENT DOCUMENTS

| | | | | |
|---|---|---|---|---|
| 2010/0332373 | A1* | 12/2010 | Crabtree | G06Q 40/04 705/37 |
| 2012/0047386 | A1* | 2/2012 | Matsui | H01M 10/465 713/340 |
| 2014/0074311 | A1* | 3/2014 | Kearns | H02J 3/38 700/297 |
| 2017/0005515 | A1* | 1/2017 | Sanders | H02J 3/381 |

OTHER PUBLICATIONS

"Markets and Operations", ISO New England: Markets and Operations, Sep. 2014, Retrieved from: https://www.iso-ne.com/markets-operations, 2 pgs.

"Smart Meters and Smart Meter Systems: A Metering Industry Perspective", An EEI-AEIC-UTC White Paper, A Joint Project of the EEI and AEIC Meter Committees, Mar. 2011, 35 pgs.

Anderson, "Scalable Software Tools and Methods for Smart Grid Modeling and Optimization", Dissertation, Stanford University, Aug. 2015, 118 pgs.

Andreson et al., "Coordination of Distributed Storage Under Temporal and Spatial Data Asymmetry", IEEE Transactions on Smart Grid, vol. 10, No. 2, Mar. 2019, Early publication Aug. 15, 2017, pp. 1184-1194.

Bemporad et al., "Robust Model Predictive Control: A Survey", Robustness in Identification and Control, vol. 245, 1999, 21 pgs.

Contreras et al., "ARIMA Models to Predict Next-Day Electricity Prices", IEEE Transactions on Power Systems, vol. 18, No. 3, Aug. 2003, pp. 1014-1019.

Galus et al., "Investigating PHEV Wind Balancing Capabilities using Heuristics and Model Predictive Control", IEEE PES General Meeting, Jul. 25-29, 2010, 10 pgs.

Gan et al., "Branch Flow Model for Radial Networks: Convex Relaxation", Proceedings of the IEEE Conference on Decision and Control, Dec. 10-13, 2012, 8 pgs.

Gan et al., "Exact Convex Relaxation of Optimal Power Flow in Radial Networks", Possible Dupe IEEE Transactions on Automatic Control, vol. 60, Issue: 1, Jan. 2015, pp. 72-87.

Gayme et al., "Optimal Power Flow with Large-Scale Storage Integration", IEEE Transactions on Power Systems, vol. 28, No. 2, May 2013, Date of Publication: Sep. 27, 2012, pp. 709-717.

Ilic et al., "Efficient Coordination of Wind Power and Price-Responsive Demand—Part I: Theoretical Foundations", IEEE Transactions on Power Systems, vol. 26, No. 4, Nov. 2011, Date of Publication: May 5, 2011, pp. 1875-1884.

Kraning et al., "Dynamic Network Energy Management via Proximal Message Passing", Foundations and Trends in Optimization, vol. 1, pp. 70-122 (2013).

Lakshminarayana et al., "Cooperation and Storage Tradeoffs in Power-Grids with Renewable Energy Resources", IEEE Journal on Selected Areas in Communications, vol. 32, No. 7, Jul. 2014, Date of Publication: Jun. 19, 2014, 11 pgs.

Mattingley et al., "Receding Horizon Control", IEEE Control Systems Magazine, vol. 31, No. 3, Jun. 2011, Date of Publication: May 12, 2011, pp. 52-65.

Qin et al., "Distributed Online Modified Greedy Algorithm for Networked Storage Operation under Uncertainty", IEEE Transactions on Smart Grid, vol. 7, No. 2, Mar. 2016, Date of Publication: May 5, 2015, pp. 1106-1118.

Qin et al., "Online Modified Greedy Algorithm for Storage Control under Uncertainty", IEEE Transactions on Power Systems, vol. 31, No. 3, May 2016, Date of Publication: Jul. 1, 2015, 14 pgs.

Trabish, "Hawaiian Electric's plan to end solar net metering, explained", Utility Dive: Deep Dive, Jan. 26, 2015, 8 pgs.

Xie et al., "Fast MPC-Based Coordination of Wind Power and Battery Energy Storage Systems", Journal of Energy Engineering, vol. 138, No. 2, Jun. 2012, pp. 43-53.

* cited by examiner

Process 1 GC process for the DSC scheme; $p$ is the price of electricity, $s$ is the net load, $d$ is the load, $u$ is storage charging rate, and $q$ is the state of charge. This process runs at each timestep $t(k)$ for each $k = 1, \ldots, T/\Delta_{GC}$

| | |
|---|---|
| Inputs: | $q_{it(k)}, \quad i \in [0:N]$ |
| Output: | $u_{i\tau}, \quad \tau \in [t(k) : t(k+1) + \Delta_F]$ |
| Forecast: | $\hat{d}^a_{i,\tau}, \quad a \in [1:A]$ |
| Process | $\displaystyle\minimize_{u,s,q,W} \frac{1}{A} \sum_a \sum_i \sum_\tau p_\tau \cdot \Re(s^a_{0\tau})$ <br> subject to: <br> $\Re(s^a_{i\tau}) = \hat{d}^a_{i\tau} + u_{i\tau},$ <br> $q_{it} = \lambda_i q_{i\tau-1} + u_{i\tau} \cdot \delta_{\min}$ <br> $u_i^{\min} \le u_{i\tau} \le u_i^{\max}$ <br> $0 \le q_{i\tau} \le q_i^{\max}$ <br> $s^a_{i\tau} = \sum_{j:(i,j)\in E}(w^a_{ij\tau} - w^a_{ii\tau})y^*_{ij}$ <br> $(v_i^{\min})^2 \le w^a_{ii\tau} \le (v_i^{\max})^2$ <br> $W^a\{i,j\}_\tau \succeq 0$ |

*FIG. 10*

Process 2 GC process for NLFC scheme; $p$ is the price of electricity, $s$ is net load including storage, $d$ is the net load excluding storage, $u$ is storage charging rate, and $q$ is the state of charge. This process runs at timestep $t(k)$ for each $k = 1, \ldots, T/\Delta_{GC}$.

| | |
|---|---|
| Inputs: | $q_{i,t(k)}, \quad i \in [0:N]$ |
| Output: | $s_{i\tau}, \quad \tau \in [t(k) : t(k+1) + \Delta_F]$ |
| Forecast: | $\hat{d}_{i,\tau}^a, \quad a \in [1:A]$ |
| Process | $\underset{u,s,q,W}{\text{minimize}} \ \frac{1}{A} \sum_i \sum_\tau p_\tau \cdot \Re(s_{0\tau})$ <br> subject to: <br> $\Re(s_{i\tau}) = \hat{d}_{i\tau}^a + u_{i\tau}^a,$ <br> $q_{it}^a = \lambda_i q_{i\tau-1}^a + u_{i\tau}^a \cdot \delta_{\min}$ <br> $u_i^{\min} \leq u_{i\tau}^a \leq u_i^{\max}$ <br> $0 \leq q_{i\tau}^a \leq q_i^{\max}$ <br> $s_{i\tau} = \sum_{j:(i,j)\in E} (w_{ij\tau} - w_{ii\tau}) y_{ij}^*$ <br> $(v_i^{\min})^2 \leq w_{ii\tau} \leq (v_i^{\max})^2$ <br> $W\{i,j\}_\tau \succeq 0$ |

FIG. 12

Process 3 LC process for NLFC scheme; $p$ is the price of electricity, $s$ is net load, $d$ is load, $u$ is storage charging rate, and $q$ is the state of charge. Within each GC iteration, this process runs at each timestep $t$ from $t(k)+1$ to $t(k+1)$ at each LC $i$

| Inputs: | $x_\tau \leftarrow \Re(s_{i\tau})$ (result from last GC program for node $i$), $\tau \in [t:t(k+1)+\Delta_F]$ |
| --- | --- |
| | $q_{t-1}$ (from local reading) |
| Output: | $u_t$ |
| Forecast: | $\hat{d}_\tau^g$, $g \in [1:G]$ |
| | $\displaystyle\minimize_{x,q,u} \sum_\tau \sum_g \|y_\tau^g - x_\tau\|_2$ |
| | subject to: |
| | $y_\tau^g = \hat{d}_\tau^g + u_\tau$ |
| | $q_\tau = \lambda_i q_{\tau-1} + u_\tau \cdot \delta_{min}$ |
| | $u^{min} \leq u_\tau \leq u^{max}$ |
| | $0 \leq q_\tau \leq q^{max}$ |

FIG. 13

Process 4 GC process for NSC scheme; $p$ is the price of electricity, $s$ is the net load, $d$ is load, $u$ is storage charging rate, and $q$ is the state of charge. This process is run at timestep $t(k)$ for each $k = 1, \ldots, T/\Delta_{GC}$.

| | |
|---|---|
| Inputs: | $q_{it_0}$, $i \in [0:N]$ |
| Output: | $x_{i\tau}^-$ and $x_{i\tau}^+$, $\tau \in [t(k) : t(k+1) + \Delta_P]$ |
| Forecast | $\hat{d}_{i\tau}^a$, $a \in [1:A]$ |

$\bar{s}_{i\tau} \leftarrow$ Solve NFLC GC in Process 2

For each node $j$:

$$\underset{s,W}{\text{minimize}} \sum_\tau (p_\tau \cdot \Re(s_{0\tau}) - 2p_\tau \cdot \Re(s_{j\tau}))$$

subject to:

$\Re(s_{i\tau}) = \Re(\bar{s}_{i\tau})$ for all $i \neq j$ and $i \neq 0$ $s_{i\tau} = \sum_{j:(i,j)\in E}(w_{ij\tau} - w_{ii\tau})y_{ij}^*$ $(v_i^{\min})^2 \leq w_{ii\tau} \leq (v_i^{\max})^2$ $W\{i,j\}_\tau \succeq 0$ $x_{j\tau}^+ \leftarrow \Re(s_{j\tau})$ For each node $j$:

$$\underset{s,W}{\text{minimize}} \sum_\tau (p_\tau \cdot \Re(s_{0\tau}) - \tfrac{1}{2}p_\tau \cdot \Re(s_{j\tau}))$$

subject to:

$\Re(s_{i\tau}) = \Re(\bar{s}_{i\tau})$ for all $i \neq j$ and $i \neq 0$ $s_{i\tau} = \sum_{j:(i,j)\in E}(w_{ij\tau} - w_{ii\tau})y_{ij}^*$ $(v_i^{\min})^2 \leq w_{ii\tau} \leq (v_i^{\max})^2$ $W\{i,j\}_\tau \succeq 0$ $x_{j\tau}^- \leftarrow \Re(s_{j\tau})$

*FIG. 15*

| | |
|---|---|
| Process 5 LC process for NSC scheme. $p$ is the price of electricity, $s$ is net load, $d$ is load, $u$ is storage charging rate, and $q$ is the state of charge. Within each GC iteration, this process runs at each timestep $t$ from $t(k)+1$ to $t(k+1)$ at each LC $i$ | |
| Inputs: | $q_t$ (local reading) <br> For $\tau \in [t : t(k+1) + \Delta_F]$: <br> $\quad x_\tau^- \leftarrow x_{i\tau}^-$ (from the GC output) <br> $\quad x_\tau^+ \leftarrow x_{i\tau}^+$ (from the GC output) |
| Output: | $u_t$ |
| Forecast: | $\hat{d}_\tau^g, g \in [1:G]$ |
| Process | minimize $\sum_g \sum_\tau p_\tau \cdot x_\tau^g$ <br> subject to: <br> $\quad x_\tau^- \leq x_\tau^g \leq x_\tau^+$ <br> $\quad x_\tau^g = \hat{d}_\tau^g + u_\tau$ <br> $\quad q_\tau = \lambda q_{\tau-1} + u_\tau \cdot \delta_{\min}$ <br> $\quad u^{\min} \leq u_\tau \leq u^{\max}$ <br> $\quad 0 \leq q_\tau \leq q^{\max}$ |

*FIG. 16*

Process 6 Simulation of the distributed control scheme over 5 iterations of a finite time horizon of length $T = 720$ hours. The GC runs at multiples of $\Delta_{GC}$, and the LC runs every timestep. The control signals from the LCs are used to compute the overall cost of operating the system. This process returns true if the control scheme does not create any powerflow violations in any of the 5 iterations.

for $m = 0, \ldots, 5$ do
    for $k = 0, \ldots, \frac{T}{\Delta_{GC}}$ do
        Generate future net load forecast from delayed data
        Run the GC algorithm
        Send GC outputs to the LCs
        for $\tau = 1, \ldots, (\Delta_{GC})$ do
            for $i = 1, \ldots, N$ do
                Generate future net load forecast for node $i$
                Run the LC algorithm on forecasted net loads and most recent GC output
                Execute LC output for current hour
            end for
        end for
    end for
    Verify that the power flow constraints are satisfied over the time horizon
    If any constraints failed, return False
    Else,
        $ARB_m$ = total grid net energy cost
end for
return Average($ARB_m, \ldots, ARB_{10}$)

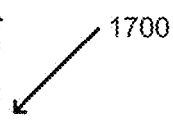

FIG. 17

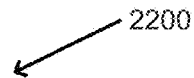

```
Process 7 Place storage and solar.
    Network ← Base Network and Load
    InstallationCount ←
        Round(SolarPenetration * Count(Network.Nodes()))
    TargetNodes ←
        Network.getRandomNodes(InstallationCount)
    TargetNodesTotalLoad =
        sum(node.AverageLoad() for node in TargetNodes)
    RawSolar = SolarPenetration*Network.AverageLoad()
    RawStorage =
        StoragePenetration*Network.AverageDailyEnergyUse()
    for Node in TargetNodes do
        α ← Node.AverageLoad() / TargetNodesTotalLoad
        Node.addRDG( α*RawSolar )
        Node.addStorage( α*RawStorage)
    end for
```

FIG. 22

Network Data — 2400

| Line Data | | | | Line Data | | | | Line Data | | | | Load Data | | Load Data | |
|---|---|---|---|---|---|---|---|---|---|---|---|---|---|---|---|
| From Bus | To Bus | R (Ω) | X (Ω) | From Bus | To Bus | R (Ω) | X (Ω) | From Bus | To Bus | R (Ω) | X (Ω) | Bus No. | Peak MVA | Bus No. | Peak MVA |
| 1 | 2 | 0.259 | 0.808 | 8 | 41 | 0.107 | 0.031 | 21 | 22 | 0.198 | 0.046 | 1 | 30 | 34 | 0.2 |
| 2 | 13 | 0 | 0 | 8 | 35 | 0.076 | 0.015 | 22 | 23 | 0 | 0 | 11 | 0.67 | 36 | 0.27 |
| 2 | 3 | 0.031 | 0.092 | 8 | 9 | 0.031 | 0.031 | 27 | 31 | 0.046 | 0.015 | 12 | 0.45 | 38 | 0.45 |
| 3 | 4 | 0.046 | 0.092 | 9 | 10 | 0.015 | 0.015 | 27 | 28 | 0.107 | 0.031 | 14 | 0.89 | 39 | 1.34 |
| 3 | 14 | 0.092 | 0.031 | 9 | 42 | 0.153 | 0.046 | 28 | 29 | 0.107 | 0.031 | 16 | 0.07 | 40 | 0.13 |
| 3 | 15 | 0.214 | 0.046 | 10 | 11 | 0.107 | 0.076 | 29 | 30 | 0.061 | 0.015 | 18 | 0.67 | 41 | 0.67 |
| 3 | 20 | 0.336 | 0.061 | 10 | 46 | 0.229 | 0.122 | 32 | 33 | 0.046 | 0.015 | 21 | 0.45 | 42 | 0.13 |
| 4 | 5 | 0.107 | 0.183 | 11 | 47 | 0.031 | 0.015 | 33 | 34 | 0.031 | 0 | 22 | 2.23 | 44 | 0.45 |
| 4 | 26 | 0.061 | 0.015 | 11 | 12 | 0.076 | 0.046 | 35 | 36 | 0.076 | 0.015 | 25 | 0.45 | 45 | 0.2 |
| 5 | 6 | 0.015 | 0.031 | 15 | 18 | 0.046 | 0.015 | 35 | 37 | 0.076 | 0.046 | 26 | 0.2 | 46 | 0.45 |
| 5 | 27 | 0.168 | 0.061 | 15 | 16 | 0.107 | 0.015 | 35 | 38 | 0.107 | 0.015 | 28 | 0.13 | | |
| 6 | 7 | 0.031 | 0.046 | 16 | 17 | 0 | 0 | 42 | 43 | 0.061 | 0.015 | 29 | 0.2 | | |
| 7 | 32 | 0.076 | 0.015 | 18 | 19 | 0 | 0 | 43 | 44 | 0.061 | 0.015 | 30 | 0.07 | | |
| 7 | 8 | 0.015 | 0.015 | 20 | 21 | 0.122 | 0.092 | 43 | 45 | 0.061 | 0.015 | 31 | 0.13 | | |
| 8 | 40 | 0.015 | 0.015 | 20 | 25 | 0.214 | 0.046 | | | | | 32 | 0.13 | | |
| 8 | 39 | 0.244 | 0.046 | 21 | 24 | 0 | 0 | | | | | 33 | 0.27 | | |

Base Voltage (KV) = 12.35
Base KVA = 1000
Substation Voltage = 12.35

*FIG. 24*

SYSTEMS AND METHODS FOR COORDINATING DISTRIBUTED ENERGY STORAGE

CROSS-REFERENCE TO RELATED APPLICATIONS

The present invention claims priority to U.S. Provisional Patent Application Ser. No. 62/502,470, entitled "Systems and Methods for Coordinating Distributed Energy Storage" and filed May 5, 2017, the disclosure of which is herein incorporated by reference in its entirety.

FIELD OF THE INVENTION

The present invention generally relates to power distribution networks and more specifically relates to the coordination of distributed energy storage using delayed information.

BACKGROUND

An incredible amount of infrastructure is relied upon to transport electricity from power stations, where the majority of electricity is currently generated, to individual homes. Power stations can generate electricity in a number of ways including using fossil fuels or using renewable sources of energy such as solar, wind, and hydroelectric sources. Once electricity is generated it travels along transmission lines to substations. Substations typically do not generate electricity, but can change the voltage level of the electricity as well as provide protection to other grid infrastructure during faults and outages. From here, the electricity travels over distribution lines to bring electricity to individual homes. The infrastructure used to transport electricity through the power grid can be viewed as a graph comprised of nodes and lines. The power stations, substations, and any end user can be considered nodes within the graph. Transmission and distribution lines connecting these nodes can be represented by lines.

Distributed power generation, electricity generation at the point where it is consumed, is on the rise with the increased use of residential solar panels and is fundamentally changing the path electricity takes to many users' homes. The term "smart grid" describes a new approach to power distribution which leverages advanced technology to track and manage the distribution of electricity. A smart grid applies upgrades to existing power grid infrastructure including the addition of more renewable energy sources, advanced smart meters that digitally record power usage in real time, and bidirectional energy flow that enables the generation and storage of energy in additional locations along the electrical grid.

SUMMARY OF THE INVENTION

Systems and methods for coordinating distributed energy storage in accordance with embodiments of the invention are illustrated. One embodiment includes a power distribution network, including a set of nodes, wherein a node includes a controllable load, an uncontrollable load, and a local controller, a power substation connected to each node in the set of nodes by a set of power distribution lines, and a global controller including a processor, a memory, and a communications device, wherein the global controller obtains load parameters from at least one node in the set of nodes, calculates coordination parameters for each node based on the obtained load parameters, and asynchronously provides the coordination parameters to each of the nodes in the set of nodes, and wherein each node independently obtains coordination parameters from the global controller, and controls the operation of its controllable load using the local controller based on the coordination parameters and a local load profile describing at least the uncontrollable load.

In another embodiment, the set of nodes are connected to the power substation using a radial network topology.

In a further embodiment, at least one node in the set of nodes further includes a storage battery.

In still another embodiment, the at least one node including a storage battery calculates local storage parameters based on the condition parameters, and the local controller for each of the at least one node causes power generated by the controllable load to be stored using the storage battery according to the local storage parameters.

In a still further embodiment, at least one power generator includes a solar panel array.

In yet another embodiment, the at least one node including the solar panel array calculates local storage parameters based on the condition parameters, and the local controller for each of the at least one node controls the operation of the solar panel array based on the local storage parameters.

In a yet further embodiment, at least one controllable load includes a power generator.

In another additional embodiment, the global controller calculates the coordination parameters by forecasting an optimal power flow based on delayed net load data, and each local controller utilizes the coordination parameters as a control signal for controlling the operation of the controllable load.

In a further additional embodiment, the global controller calculates the coordination parameters by forecasting a net load profile for each node in the set of nodes at a plurality of timestamps, and each local controller utilizes the coordination parameters as a control signal for controlling the operation of the controllable load at each timestamp provided in the coordination parameters for the specific node having the local controller.

In another embodiment again, the global controller calculates the coordination parameters by calculating an upper bound and a lower bound on the net load for each node in the set of nodes, and each local controller utilizes the coordination parameters as a control signal for controlling the operation of the controllable load such that the net load generated by each controllable load is within the upper bound and the lower bound provided in the coordination parameters for the specific node having the local controller.

In a further embodiment again, a method for controlling a power generation network, includes obtaining load parameters from at least one node in a set of nodes using a global controller, wherein each node in the set of nodes includes a controllable load, an uncontrollable load, and a local controller, and the global controller includes a processor, a memory, and a communications device, calculating coordination parameters for each node based on the obtained load parameters using the global controller, asynchronously providing the coordination parameters to each of the nodes in the set of nodes using the global controller, obtaining coordination parameters from the global controller using each local controller for each node in the set of nodes, and controlling the operation of each controllable load based on the coordination parameters and a load profile using each local controller for each node in the set of nodes.

In still yet another embodiment, the set of nodes are connected to using a radial network topology.

In a still yet further embodiment, at least one node in the set of nodes further includes a storage battery.

In still another additional embodiment, the method further includes calculating local storage parameters based on the condition parameters, and storing power generated by the controllable load using the storage battery according to the local storage parameters.

In a still further additional embodiment, at least one controllable load includes a solar panel array.

In still another embodiment again, the method further includes calculating local storage parameters based on the condition parameters, and controlling the operation of the solar panel array based on the local storage parameters using the local controller.

In a still further embodiment again, at least one controllable load includes a power generator.

In yet another additional embodiment, the method further includes calculating the coordination parameters by forecasting an optimal power flow based on delayed net load data using the global controller, and utilizing the coordination parameters as a control signal for controlling the operation of the controllable load using each local controller for each node in the set of nodes.

In a yet further additional embodiment, the method further includes calculating the coordination parameters by forecasting a net load profile for each node in the set of nodes at a plurality of timestamps using the global controller, and utilizing the coordination parameters as a control signal for controlling the operation of the controllable load at each timestamp provided in the coordination parameters for the specific node using the local controller for each node in the set of nodes.

In yet another embodiment again, the method further includes calculating the coordination parameters by calculating an upper bound and a lower bound on the net load for each node in the set of nodes using the global controller, and utilizing the coordination parameters as a control signal for controlling the operation of the controllable load using the local controller for each node in the set of nodes such that the net load generated by each controllable load is within the upper bound and the lower bound provided in the coordination parameters for the specific node having the local controller.

In a yet further embodiment again, the controllable load is a wind generator.

In another additional embodiment again, a power distribution network, includes a set of nodes, wherein a node includes a power generator and a local controller and is modeled as a stochastic uncontrollable load, a power substation connected to each node in the set of nodes by a set of power distribution lines, and a global controller including a processor, a memory, and a communications device, wherein the global controller obtains load parameters from at least one node in the set of nodes, calculates coordination parameters for each node based on the obtained load parameters, and asynchronously provides the coordination parameters to each of the nodes in the set of nodes, and wherein each node independently obtains coordination parameters from the global controller, calculates local storage parameters based on the coordination parameters, and adjusts the operation of the power generator based on the coordination parameters and the local storage parameters to generate power in accordance with an optimal power flow within the power distribution network.

In a further additional embodiment again, a method for controlling a power generation network, includes obtaining load parameters from at least one node in a set of nodes using a global controller, wherein each nodes in the set of nodes includes a power generator and a local controller and is modeled as a stochastic uncontrollable load, and the global controller including a processor, a memory, and a communications device, calculating coordination parameters for each node based on the obtained load parameters using the global controller, asynchronously providing the coordination parameters to each of the nodes in the set of nodes using the global controller, obtaining coordination parameters from the global controller using each local controller for each node in the set of nodes, calculating local storage parameters based on the coordination parameters using each local controller for each node in the set of nodes, and adjusting the operation of each power generator based on the coordination parameters and the local storage parameters using each local controller for each node in the set of nodes to generate power in accordance with an optimal power flow within the power distribution network.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

FIG. 10 is a chart illustrating psuedocode that can be utilized to solve for optimal power flow in accordance with an embodiment of the invention.

FIG. 12 is a chart illustrating psuedocode that can be used with a global controller to solve for optimal power flow utilizing a net load following control process in accordance with an embodiment of the invention.

FIG. 13 is a chart illustrating psuedocode that can be used with a local controller to solve for optimal power flow utilizing a net load following control process in accordance with an embodiment of the invention.

FIG. 15 is a chart illustrating psuedocode that can be used with a global controller to solve for optimal power flow utilizing a nodal slack control scheme in accordance with an embodiment of the invention.

FIG. 16 is a chart illustrating psuedocode that can be used with a local controller to solve for optimal power flow utilizing a nodal slack control scheme in accordance with an embodiment of the invention.

FIG. 17 is a chart illustrating psuedocode that can be used to evaluate distributed control schemes in accordance with an embodiment of the invention.

FIG. 22 is a chart illustrating psuedocode that can be used for RDG and storage placement in a network in accordance with an embodiment of the invention.

FIG. 24 is a chart illustrating the resistance and reactance values for each line in the circuit illustrated in FIG. 23 in accordance with an embodiment of the invention.

DETAILED DESCRIPTION

Figure 1:
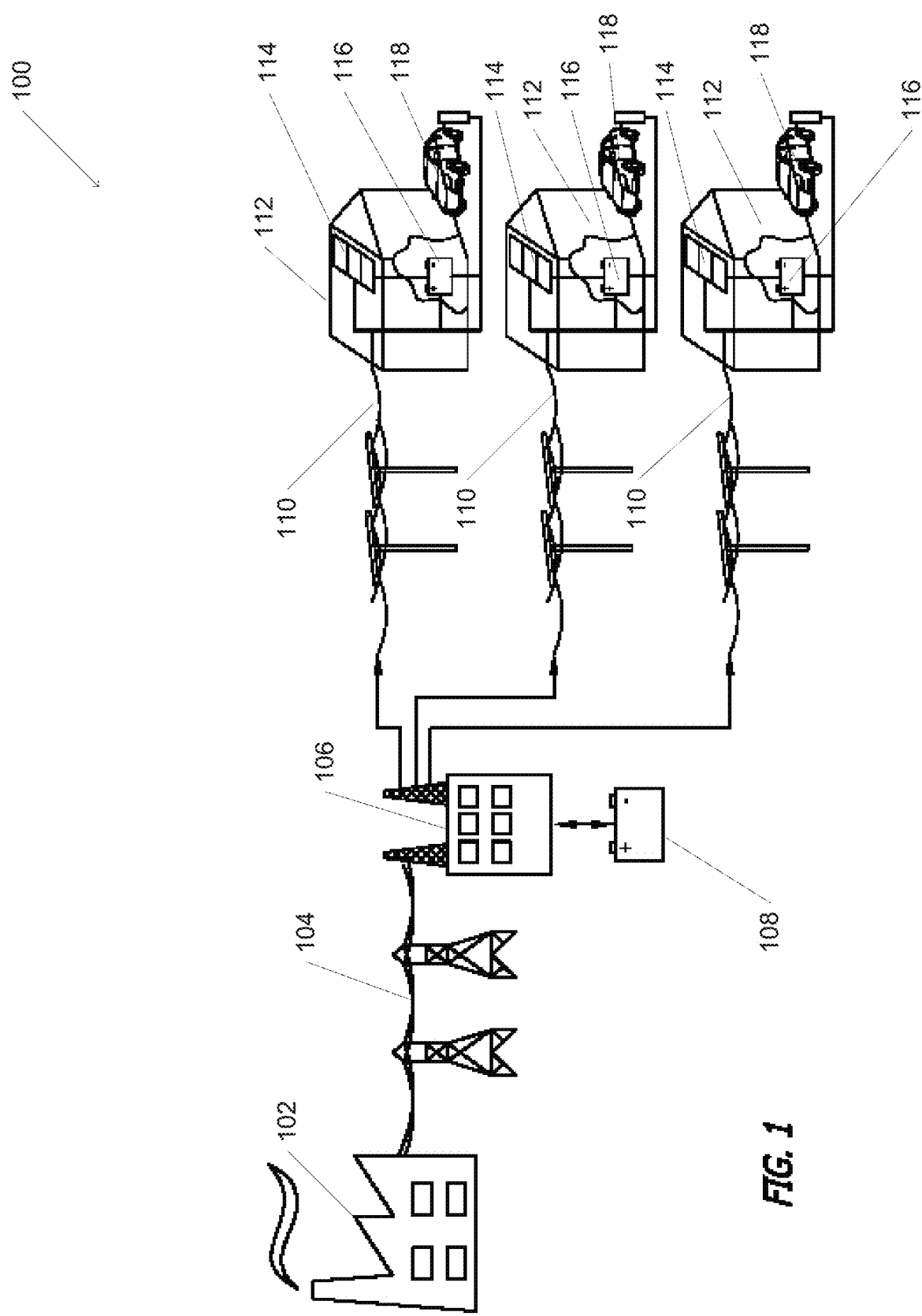
FIG. 1 is a conceptual illustration of a power distribution network in accordance with an embodiment of the invention.

Turning now to the drawings, systems and methods for the distributed control of energy storage coordinating between nodes and utility providers in a power distribution network in accordance with embodiments of the invention are illustrated. In many embodiments, processes are performed to coordinate distributed energy control of a power distribution network. In a number of embodiments, processing nodes are distributed throughout a power distribution network that control power load, distributed power generation, and remote battery storage. In several embodiments, the processing nodes control the operational parameters of aspects of the power distribution network in an effort to achieve what is often referred to as Optimal Power Flow (OPF). Achieving OPF involves optimizing the operation of a power system with respect to one or more objectives. These objectives can include (but are not limited to) minimizing the amount of power lost during the transmission of power to a user, minimizing the cost of generating the power needed for the system, and/or seeking to optimize other general operational constraints. In various embodiments, calculating OPF can be separated from calculating the coordination of power flow within a power distribution network.

The control of power flow within a power distribution network can involve global control and/or local control. In many embodiments, a global controller (GC) sends instructions to coordinate many nodes within the network. Individual local controllers (LC) can control power flow at each individual node. A number of distributed power control systems have been proposed that assume continuous communication between a GC and multiple LCs. In the existing power grid, it is common to have delays in data received by a GC due to (but not limited to) delay in smart meter communication infrastructure and/or connectivity problems. In many real world applications, delays of an hour or more between messages exchanges can be common. Since the timing of the receipt of data from LCs can be unpredictable, in various embodiments GCs can buffer information before performing calculations. Furthermore, a GC can provide instructions to LCs that enable the LCs to perform localized control for a period of time with infrequent updates in a manner that greatly increases the performance of the overall network relative to a system that employed no localized control and/or systems that performed localized control without global coordination. In this way, distributed control systems in accordance with various embodiments of the invention can achieve performance using infrequent information exchanges with a GC that is comparable to the performance that can theoretically be achieved by a distributed control system in which the GC and LCs are able to continuously communicate.

GC and LCs in accordance with various embodiments of the invention can use a variety of processes to calculate energy flow within a power distribution network including (but not limited to) direct storage control (DSC) processes, net load following control (NFLC) processes, and/or nodal slack control (NSC) processes. DSC processes can calculate parameters for an upcoming window at the GC, which is then transmitted to all the LCs. NFLC processes can generally have the GC calculate a net load profile for each node and LCs adjust their parameters to fit this net load profile. NSC processes have a GC compute a upper and lower bound on net load at each node and LCs optimize local parameters within these bounds. While specific processes with respect to optimal flow control and power network optimization are described below, it should be appreciated that any of a variety of control processes and/or control objectives can be utilized in distributed power control systems that leverage intermittent global coordination in accordance with various embodiments of the invention.

Systems and methods for performing distributed control through GC and LCs to calculate power flow in a power distribution network that can be utilized in the implementation of such systems and methods in accordance with embodiments of the invention are discussed further below.

Radial Power Distribution Networks

A power distribution network in accordance with an embodiment of the invention is shown in FIG. 1. Electricity is generated in power generator 102. Power transmission lines 104 can transmit electricity between the power generator and power substation 106. Power substation 106 additionally can connect to large storage battery 108, which temporarily stores electricity, as well as power distribution lines 110. The power distribution lines 110 can transmit electricity from the power substation to homes 112. The homes can include solar panes 114, a house battery 116, and/or an electric car 118. Power distribution networks can transmit electricity in many ways including (but not limited to) single phase, multiphase balanced, and multiphase unbalanced.

The power generator 102 can represent a power source including those using fossil fuels, nuclear, solar, wind, or hydroelectric power. Substation 106 changes the voltage of the electricity for more efficient power distribution. Solar panels 114 are distributed power generation sources, and can generate power to supply the home as well as generate additional power for the power grid. House battery 116 can store excess electricity from the solar panels to power the home when solar energy is unavailable, or to store electricity from the power grid to use at a later time including to use (but not limited to) when purchasing power from the power grid is more expensive.

Substations 106, large storage batteries 108, homes 112, solar panels 114, house batteries 116, and electric cars 118 can all be considered nodes within the power distribution network and the distribution lines 110 can be considered to be lines within the power distribution network. In combination, nodes and lines typically form a radial network. Power distribution networks are often represented as radial networks. Radial networks have a tree topology where each node is connected to a single unique ancestor and a set of unique children. Radial networks can be utilized in modeling the distribution side of the power grid. In many embodiments, local controllers are located at nodes throughout the network to coordinate energy storage in a distributed manner. Connected nodes can be nodes within the power distribution network that are connected by distribution and/or transmission lines and can be controlled by a local controller. In many embodiments, a global controller can send coordinated signals to local controllers at each node. A variety of distributed control schemes can be utilized by local controllers including (but not limited to) direct storage control, net load following control, and/or nodal slack control. Although many different systems are described above with reference to FIG. 1, any of a variety of power distribution networks including node controllers may be utilized to coordinate energy storage as appropriate to the requirements of specific applications in accordance with embodiments of the invention. Nodes utilizing node controllers connected to a communications network in accordance with various embodiments of the invention are discussed below.

Node Controller Architectures

Figure 2:
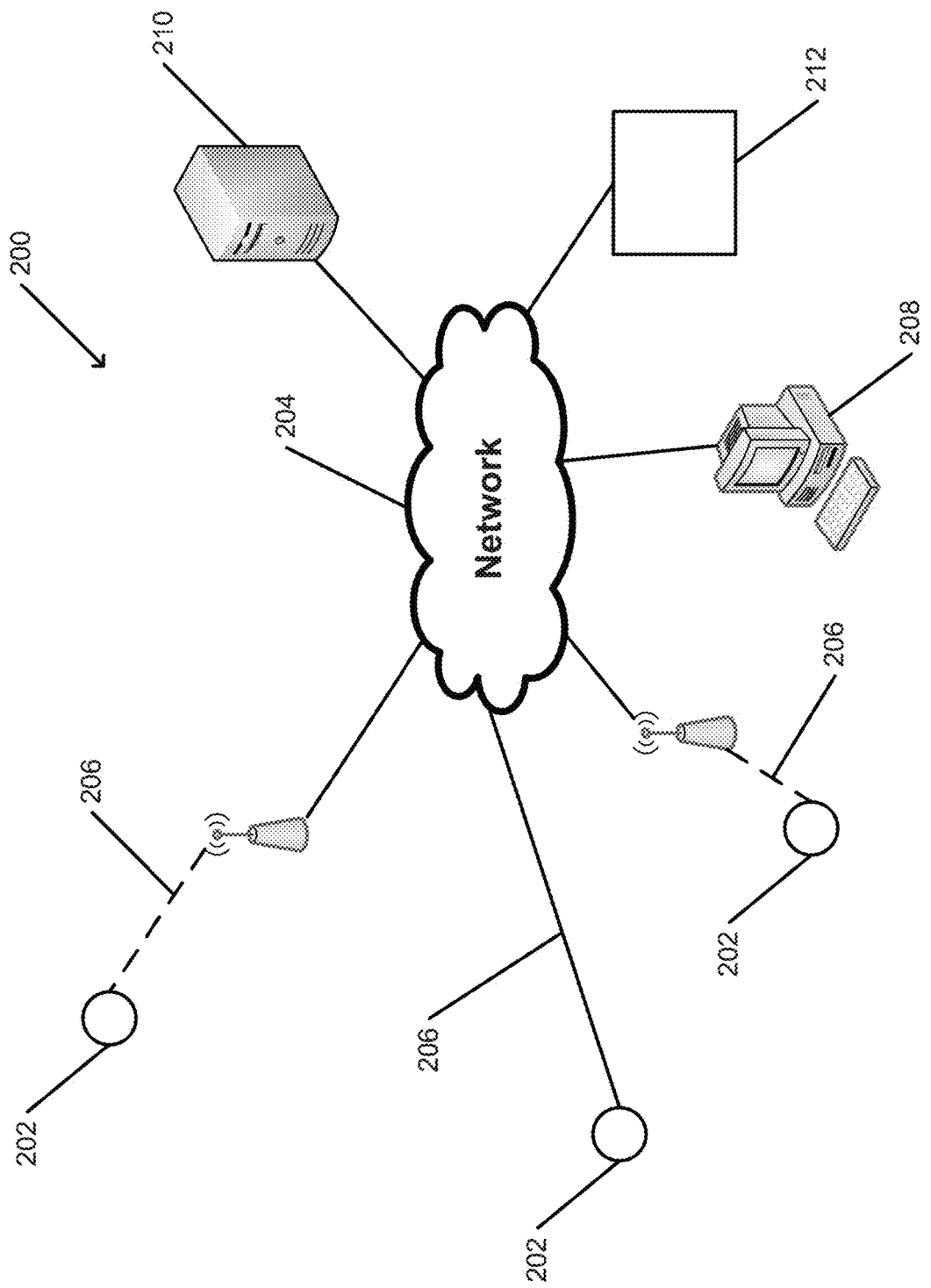
FIG. 2 is a conceptual illustration of nodes in a communications network in accordance with an embodiment of the invention.

Nodes utilizing node controllers connected to a communication network in accordance with an embodiment of the invention are shown in FIG. 2. Nodes 202 can connect to communication network 204 using a wired and/or wireless connection 206. In some embodiments, the power distribution network can act in place of the communication network. The communication network may also be connected to one or more centralized computing systems 208. In some embodiments, centralized computing systems can store software applications to monitor calculations made by or to send instructions to individual nodes to, for example, control power distribution at a global level. Additionally, in many embodiments a database management system 210 can be connected to the network to track node data which, for example, may be used to historically track power usage at various locations over time. In several embodiments, a resource provider 212 such as (but not limited to) a power utility company can connect to the nodes in the communications network. Centralized computing systems 208 can further be used to control coordinated power distribution between the resource provider and network nodes. Although various system configurations are described above with respect to FIG. 2, any number of systems can be utilized to achieve coordinated control between a utility provider and network nodes within a power distribution network as appropriate to the requirements of specific applications in accordance with embodiments of the invention. Global controllers in accordance with various embodiments of the invention are discussed below.

Global Controllers

Figure 3:
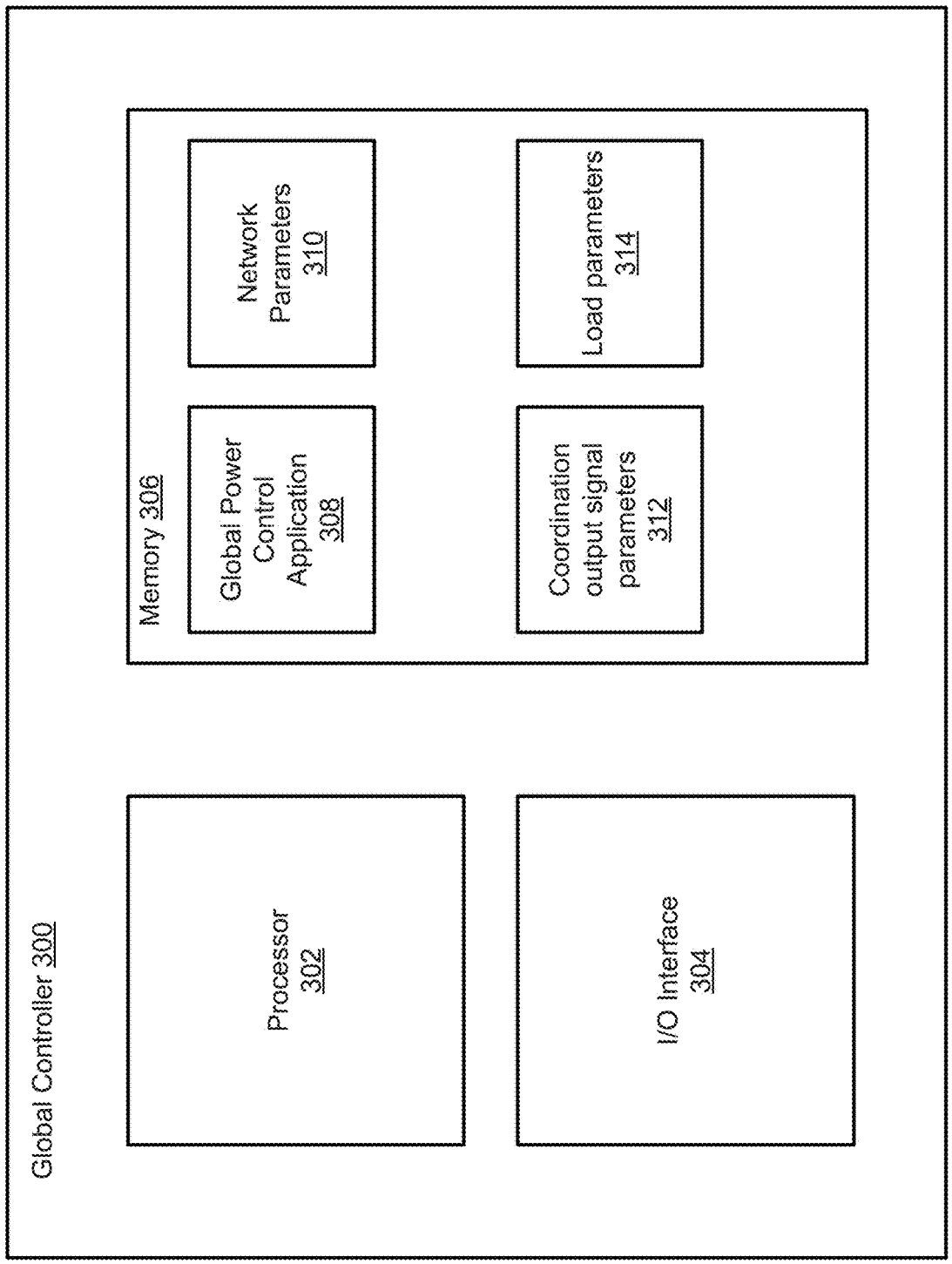
FIG. 3 is a conceptual illustration of a global controller in accordance with an embodiment of the invention.

A global controller in accordance with an embodiment of the invention is shown in FIG. 3. In various embodiments, a global controller 300 can perform calculations using one or more centralized computing systems using load parameters to determine coordination output signal parameters for nodes on a radial network. Many embodiments of the invention can include a global controller that is configured to coordinate between nodes in the radial network and a utility company. In the illustrated embodiment, the global controller includes at least one processor 302, an I/O interface 304, and a memory 306. The at least one processor 302, when configured by software stored in memory, can perform calculations on and make changes to data passing through the I/O interface as well as data stored in memory. In many embodiments, the memory 306 includes software including the global power control application 308 as well as network parameters 310, coordination output signal parameters 312, and load parameters 314.

In many embodiments, the global controller receives outdated load parameters from the network, in come cases the information is delayed by up to several hours and/or the information is timely when received but updated infrequently. The global controller can calculate coordination output signal parameters for the power distribution network using load parameters it receives though the I/O interface from the nodes in the network. The global power control application 308 will be discussed in greater detail below and can enable the global controller to perform calculations to solve for optimal power flow in the power distribution network using a variety of processes including (but not limited to) direct storage control processes, net load following control processes, and/or nodal slack control processes. Direct storage control processes, net load following control processes, and nodal slack control processes are discussed below. It should be readily apparent the aforementioned power flow processes are merely illustrative and any of a variety of process solving for optimal power flow and coordination output signal parameters can be used as appropriate to the requirements of various embodiments of the invention. Although a variety of different global controllers are described above with reference to FIG. 3, any of a variety of computing systems can be utilized to control a global controller within a power distribution system as appropriate to the requirements of specific applications in accordance with various embodiments of the invention. Local controllers in accordance with various embodiments of the invention are discussed below.

Node Controllers

Figure 4:
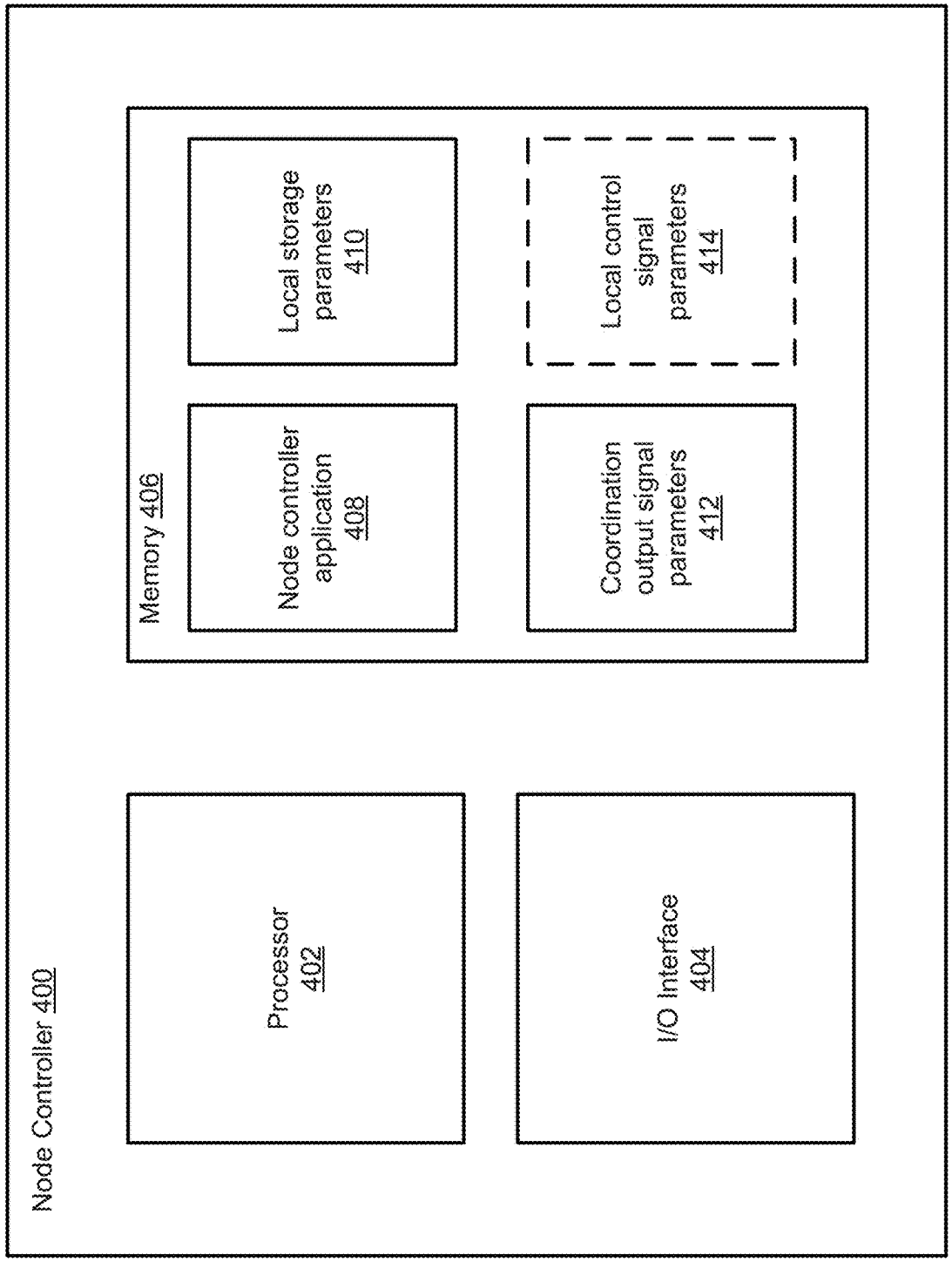
FIG. 4 is a conceptual illustration of a local controller in accordance with an embodiment of the invention.

A local controller in accordance with an embodiment of the invention is shown in FIG. 4. In several embodiments, local controller 400 can control local control signal parameters of a node in a power distribution network. In the illustrated embodiment, the local controller includes at least one processor 402, an I/O interface 404, and memory 406. The at least one processor 402, when configured by software stored in memory, can perform calculations on and make changes to data passing through the I/O interface as well as data stored in memory. In many embodiments, the memory 406 includes software including a node controller application 408 as well as local storage parameters 410, coordination output signal parameters 412, and local control signal parameters 414. A node can receive coordination output signal parameters from a global controller within the power distribution network. In many embodiments, a local controller using received coordination output signal parameters and local storage parameters can calculate local control signal parameters using the node controller application. Local control signal parameters are discussed below, and can include (but are not limited to) parameters that control solar panels and/or the charging of local batteries. A variety of schemes can be used to calculate local control signal parameters including (but not limited to) direct storage control processes, net load following control processes and/or nodal slack control processes. However, it should be readily apparent that these schemes are merely illustrative and a variety of different processes for solving optimal power flow at nodes can be used in accordance with embodiments of the invention. Although a variety of different local controllers are described above with reference to FIG. 4, any of a variety of computing systems can be utilized to control a local controller within a power distribution network as appropriate to the requirements of specific applications in accordance with many embodiments of the invention. The use of global controllers for distributed energy storage to implement optimal power flow within a radial network in accordance with several embodiments of the invention are discussed below.

Use of Global Controllers to Achieve Optimal Power Flow

Distributed energy storage (DES) can benefit the grid in several ways, including (i) shifting the load through energy arbitrage (EA) by charging during off-peak hours and discharging during peak hours; (ii) supporting renewable distributed generation (RDGs) by performing Volt/VAr control to help reduce the voltage violations, reactive power imbalance, and increased network losses caused by the bidirectional power flow introduced by RDGs, (iii) providing regulation service (RS) or other ancillary services that absorb short-term mismatches in supply and demand; (iv) avoiding future capital expenses for distribution infrastructure used to serve peak load; and (v) increasing grid security by providing emergency power during outages.

The second benefit of supporting RDGs is especially important today as rooftop solar installations in the U.S. have been increasing by 7.5% per year and are growing even faster in some regions. For example, in Hawaii, rooftop solar penetration has already reached 12% prompting grid operators to institute limits on net metering programs to limit the aforementioned adverse effects of bidirectional power flow. Realizing the potential benefits of DES can, however, involve the development of scalable distributed storage control schemes that operate within the power and data constraints of real world electric power distribution systems with potentially tens of thousands of customers.

Figure 5:
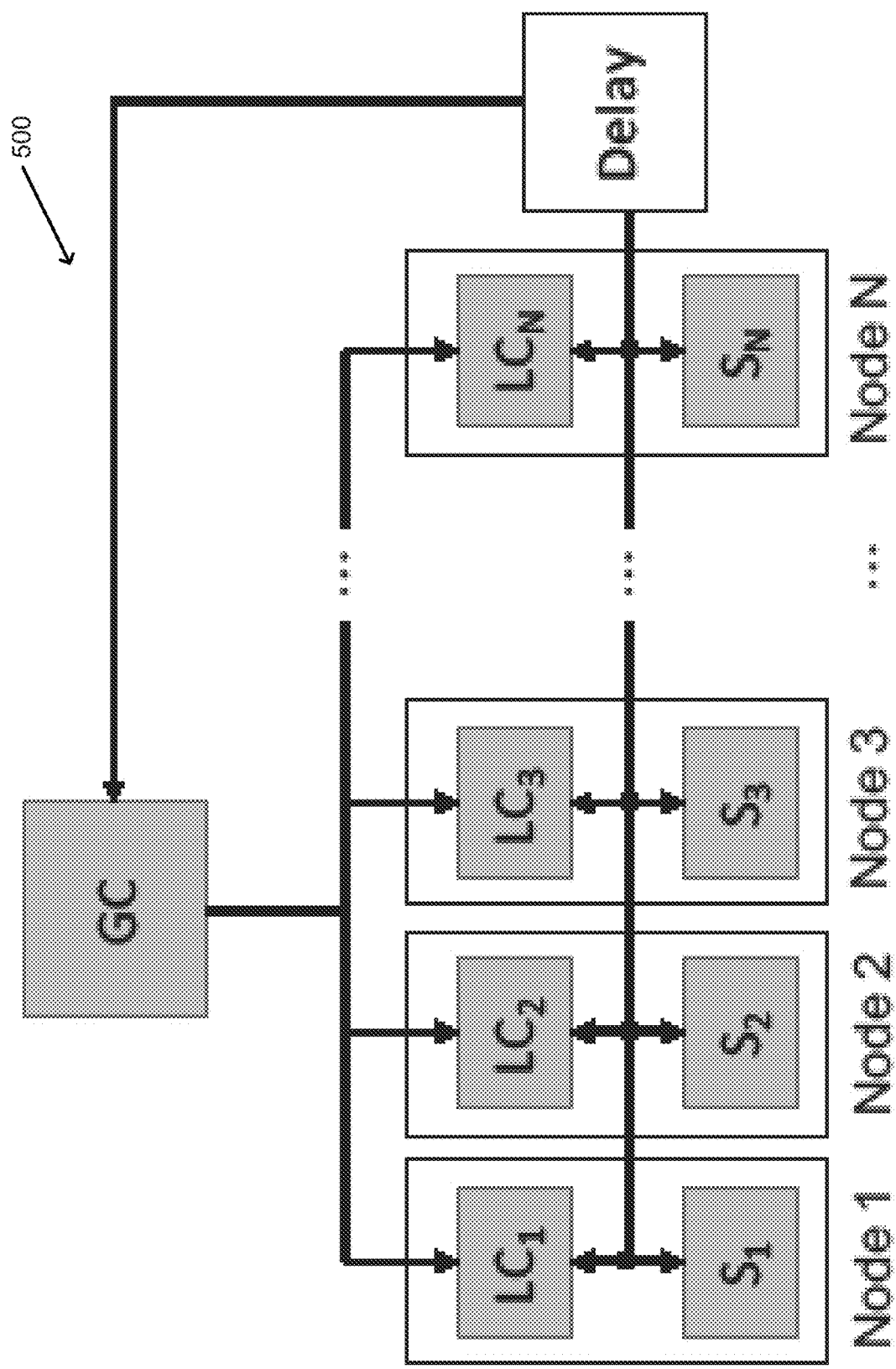
FIG. 5 is an illustration of data flow in a distribution system in accordance with an embodiment of the invention.

A challenge in developing such control schemes is the spatial and temporal asymmetry in the availability of load and generation data across the network due to: (i) the stochastic nature of loads and renewable generation, (ii) the distributed locations of the loads, renewable generation, and storage units, and (iii) the buffering delay in communicating the data from where it is generated to where it is used for the control. This spatiotemporal asymmetry can be captured in data availability via the high level model of the communication/control plane of a distribution system shown in FIG. 5. FIG. 5 illustrates data flow in a distribution system with N customers with net loads $S_1, \ldots, S_N$ and local controllers $LC_1, \ldots, LC_N$. The local controllers communicate their data to a global controller GC, subject to a delay. The GC sends back control signals to the LCs based on the delayed information and its knowledge of the distribution network. These communications can themselves be delayed.

The system comprises N nodes, each representing an aggregated collection of stochastic uncontrollable loads and renewable generators as well as controllable storage. The total net load from each of these sources (which is stochastic and only partially controllable) is denoted by $s_i$, i=1, 2, . . . , N. The nodes are connected via a communication network to a global controller GC, which is a software process that may be running at the substation or in the cloud. The GC has access to net load data from the nodes through a communication network subject to a delay. This delay may be the result of the smart meter infrastructure, which can introduce over 6 hours of delay in data propagation, or simply due to worst case packet delays in the communication network itself. It can be assumed that the GC has perfect knowledge of the electric network model (line impedances, transformer settings, etc.), and can therefore solve a network power flow problem to compute voltages at each point in the network. However, the results of this computation are imperfect due to the delay and the intrinsic uncertainty about future net node loads.

In many embodiments, each node includes a unit capable of computing and communicating with the GC, a local storage and sensors that measure load consumption and renewable generation in real-time. The node has a local controller (LC), which is a software process that may be running within a smart meter, within the firmware of the storage unit, or in a home automation appliance. The LC can control the net nodal load by setting the storage rate, subject to the physical constraints of the storage unit. The LC at node i makes its decisions based on perfect knowledge of past and present values of the net load $s_i$ as well as on the control signals from the GC. As for the case of the GC, the LC does not have perfect knowledge of future $s_i$ values due to the stochastic nature of the net load. The LC, however, has a better capacity to estimate its future load than the GC, because it has access to more recent past data than the GC (and potentially data acquired at a higher sampling rate).

Distributed control systems in accordance with many embodiments of the invention address the problem of how to distribute the DES control between the GC and the LCs to simultaneously optimize energy arbitrage and support RDGs under the constraints and assumptions of the model in FIG. 5. The ability of the system to tolerate high delay can make the system less vulnerable to communication network failures, reduce the need to upgrade the smart meter infrastructure to provide faster data propagation, and make it feasible to simply use existing home broadband services to communicate with the GC. This framework can be easily extended to consider LCs asynchronously operating at a different time-scale than the GC.

The optimal control of distributed storage in power distribution networks typically involves the interaction between the cyber and physical system in the power network. Optimal control can be impacted by the following factors: (i) the nonlinear network power flow constraints, (ii) the stochastic nature of loads and renewable generation, (iii) the spatial and temporal asymmetry of data (load/RDG forecasts), and (iv) the communication delay in the network. In a setting with deterministic loads and RDG outputs, the optimal control can be determined exactly by solving a global optimal power flow problem over a finite time horizon and with storage dynamics. In a stochastic load setting, heuristic methods such as the rollout algorithms or model predictive control can be applied to approximate control problems of renewable generation and storage. More recent approaches have developed stochastic network control algorithms that approximate the optimal solution with different types of performance guarantees. These methods often do not consider the spatial and temporal asymmetry of data. Many methods solve for optimal power flow with storage over a finite time horizon. In these methods, each node in the network solves a subproblem and exchanges messages with its neighbors iteratively until the system finds a globally optimal solution.

The methods assume no delay in communications and the availability of a reliable peer to peer connection for each LC capable of supporting a large number of iterations of the algorithms for each storage decision. In practice, existing utility networks do not support such real-time peer-to-peer communication. Experimental systems where the LC utilizes broadband internet to communicate with the GC are unable to guarantee sufficient communication reliability to enable a large number of fast iterations.

In several embodiments, DES control schemes can be developed in which the GC computes and sends output signals to the LCs based on the delayed net load and state of charge, and each LC computes a control signal for the storage unit under its purview based on real-time local net load, state of charge, and the output signal received from the GC. This process is repeated continuously over an analysis horizon using Receding Horizon Control (RHC). As is discussed below, the physical constraints of the network and storage as well as the communication constraints can be modeled and used to formulate the DES control problem as a general stochastic optimization problem. Accordingly, an optimal solution for this problem can be developed under perfect load and generation foresight. This provides an infeasible solution to the real problem but serves as a bound on the performance of implementable control schemes. Three distributed control schemes are discussed below. The first scheme is the Direct Storage Control (DSC) in which the GC algorithm solves an optimal power flow using forecasts based on delayed net load data, and each LC passes through the GC output as the control signal. This method suffers in networks with large delays because it does not consider the more fresh past net load data available at the LCs. The second scheme is the Net Load Following Control (NLFC) in which the GC outputs a net load profile for each customer. Each LC generates a new forecast at each timestep and updates the charging schedule to minimize the deviation from the load profile sent by the GC. This method benefits from updating the storage decisions based on the more fresh load data at the LCs, but suffers from the requirement that each net load must follow a precomputed profile, which may reduce arbitrage profits. The last scheme is the Nodal Slack Controller (NSC) in which the GC outputs feasible bounds on the net load at each node and each LC determines a control signal by minimizing its local operational cost while ensuring that the net load stays within these bounds. This technique avoids the overly restrictive nature of the NLFC method by loosening the constraints on the net load profile. In the last section, the performance of these three distributed control schemes is characterized under an array of assumptions regarding the communication delay, network model, and forecast error. It can be observed that the NLFC and NSC schemes are able to support higher RDG penetrations than DSC, and that the NSC scheme is able to do so with higher arbitrage profits.

Optimal Power Flow Problem

The steady state power flows in a radial distribution network can be modeled by a tree with N+1 nodes. This network can be analyzed over T timesteps each of length $\delta_{min}$ and it can be assumed that all quantities are constant over each timestep. The notation and variables used in the problem setup are summarized in Table 1. The nodes in the network are indexed by $i \in \{0, 1, 2, \ldots, N\} = [0: N]$. Node i=0 is the root node typically corresponding to a substation. The remaining nodes $i \in \{1, \ldots, N\}$ model buses with the following:

Uncontrollable load. This includes a stochastic uncontrollable load and renewable generation, both of which are assumed to be real and independent of the power factor. The combined uncontrollable load at node i and timestep $t \in [1: T]$ is denoted by $d_{it}$. This value may be positive or negative.

Energy Storage. A storage unit such as a battery with a maximum capacity $Q^{max}$. At time t, each storage unit has a net charging rate of $u_{it}$ and a state of charge of $q_{it}$. It can be assumed that each storage only charges and discharges real power. For simplicity, storage charges and discharges with an efficiency of X. Hence, the storage dynamics are $q_{it} = \lambda_i u_{it} \cdot \delta_{min} + q_{it-1}$.

The complex net load can be denoted at node i by $s_{it}$, where $\Re(s_{it}) = d_{it} + u_{it}$ and $\Im(s_{it})$ $\Re$ is determined by the network. The root node load $s_{0t}$ represents the aggregate network load at time t. The real part of this value (denoted by $\Re(s_{0t})$) represents the power purchased or sold into the wholesale energy market at a time-varying price of $p_t$. The relationship between the net load and the voltage at each node $i \in [0: N]$ is governed by the AC powerflow equation, $$s_{it} = v_{it} \sum_{j:(j \to i)} (v_{jt}^* - v_{it}^*) y_{ij}^*,$$

$$v_i^{max} \leq |v_{it}| \leq v_i^{max},$$

where $v_{it}$ is the node voltage, $v_{it}^*$ is its conjugate, $y_{ij}$ is the admittance of the line connecting node i to node j, and $v_i^{min}$ and $v_i^{max}$ are the maximum and the minimum of the voltage magnitude, respectively.

If all d values are known and real-time communication is available to distribute charging decisions, the storage charging rates that minimize the total operational cost of the network can be determined while ensuring that all network constraints are satisfied by solving the following program. Equations (1a) to (1c) are included for nodes $i \in \{1, \ldots, N\}$ and $t \in \{1, \ldots, T\}$ and correspond to net load and storage constraints. Equations (1e) and (1f) correspond to the power flow and are included for all nodes (including the root i=0) and time periods. These qualifications are omitted in the remainder of the paper for ease of readability.

$$\underset{u,s,q,V}{\text{minimize}} \sum_{t=1}^{T} p_t \cdot \Re(s_{0t})$$

subject to $$\Re(s_{it}) = \overline{d}_{it} + u_{it}, \tag{1a}$$

$$q_{it} = \lambda_i q_{it-1} + u_{it} \cdot \delta_{min}, \tag{1b}$$

$$u_i^{min} \leq u_{it} \leq u_i^{max}, \tag{1c}$$

$$0 \leq q_{it} \leq q_i^{max}, \tag{1d}$$

$$s_{it} = v_{it} \sum_{j:(j \to i)} (v_{jt}^* - v_{it}^*) y_{ij}^*, \tag{1e}$$

$$v_i^{min} \leq |v_{it}| \leq v_i^{max}. \tag{1f}$$

In various embodiments, the voltage constraints in the above program are non-convex. Since the network is a tree, it can be reformulated as a convex problem using the convex relaxation technique by replacing the voltage decision variables with $$w_{ij} = v_i v_j^*$$

for every node i connected to node j. Denote by W the matrix consisting of all $w_{ij}$ values and by $W\{i,j\}$ the 2×2 submatrix $$W\{i,j\} = \begin{bmatrix} w_{ii} & w_{ij} \\ w_{ji} & w_{jj} \end{bmatrix} (j \leftarrow i).$$

(1) can be expressed using the equivalent convex program, $$\underset{u,s,q,W}{\text{minimize}} \sum_t p_t \cdot \Re(s_{0,t}) \quad (2)$$

subject to $$\Re(s_{it}) = \bar{d}_{it} + u_{it},$$

$$q_{it} = \lambda_i q_{it} - 1 + u_{it} \cdot \delta_{min},$$

$$u_i^{min} \leq u_{it} \leq u_i^{max},$$

$$0 \leq q_{it} \leq q_i^{max},$$

$$s_{it} = \sum_{j:(i,j) \in E} (w_{ijt} - w_{iit}) y_{ij}^*,$$

$$(v_i^{min})^2 \leq w_{iit} \leq (v_i^{max})^2,$$

$$W\{i,j\}_t \succeq 0.$$

The solution of this program can be referred to as the perfect foresight optimal storage controller (PFOSC). This solution assumes that a global controller has access to information about loads in real-time. Of course this scenario is unrealistic, but this solution will serve as a benchmark on the performance of control methods in accordance with various embodiments of the invention that operate under uncertainty and delay.

Figure 6:
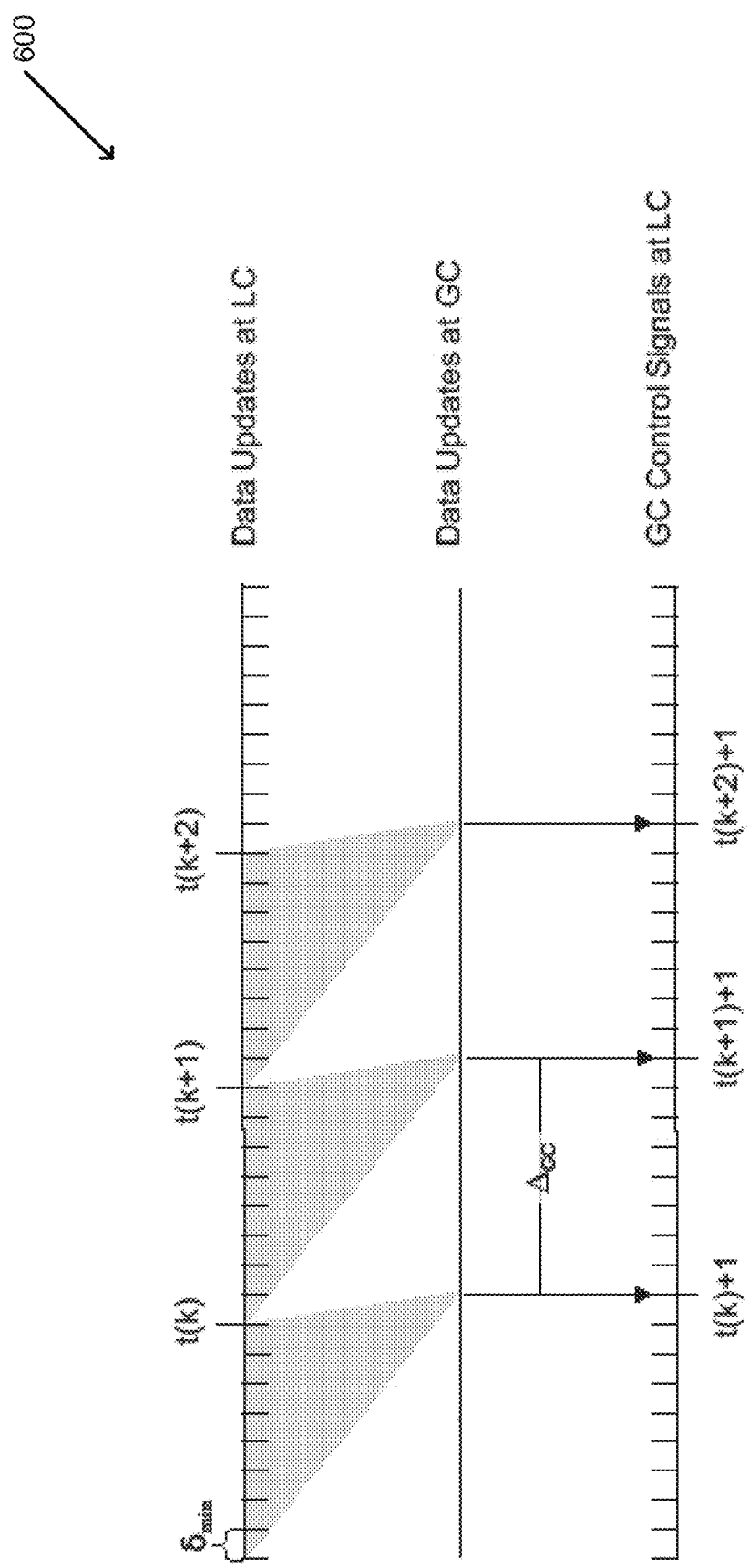
FIG. 6 is a timing diagram of data availability between local controllers and global controllers in a distribution system in accordance with an embodiment of the invention.

In several embodiments, the GC and LCs do not know the future state of the system required to implement PFOSC. Instead, the GC and the LCs have the ability to utilize their information to generate estimates of future loads. The forecast of the load for node i at future time τ can be denoted as $\hat{d}_{i,\tau}$. In general the GC will utilize strategies that use the forecast in lieu of the actual load to determine its output. In an simulated example discussed below, an ARIMA model will be used to forecast future loads. In general, the load forecast error for a given timestep increases with delay in the available load data, which motivates distributing the control between the GC and the LCs. A timing diagram of data availability between LCs and GCs in a distribution system in accordance with an embodiment of the invention is illustrated in FIG. 6.

In various embodiments, the goal can be to find a distributed control method including both the GC and the LC processes that jointly minimizes the expected operational cost of the network under the aforementioned asymmetric data model, while reducing the likelihood that no network constraints are violated.

TABLE 1

Constants and variables used in the formulation

| | Constants |
|---|---|
| p | Energy price for 1 kW of power over $\delta_{min}$ interval ($/(kW · $\delta_{min}$)) |
| $u^{min}$ | Min charging rate |
| $u^{max}$ | Max charging rate |
| $v^{min}$ | Min voltage |
| $v^{max}$ | Max voltage |
| $y_{ij}$ | Admittance of line between connecting node i and node j |
| $q^{max}$ | Storage capacity |
| $\Delta_{GC}$ | Timesteps between GC runs |
| $\delta_{min}$ | Length of timestep |
| λ | Storage efficiency |
| $\Delta_F$ | Look ahead horizon for GC |
| A | Number of scenarios for GC optimization |
| G | Number of scenarios for LC optimization |
| | Independent Variables |
| d | Load (uncontrollable load and renewable generation) |
| | Dependent Variables |
| v | Voltage |
| w | Voltage after convex relaxation |
| q | State of charge |
| s | Net load (real part includes the load and charging) |
| u | Charging rate |
| | Notation for any random variable X |
| $x_{it}$ | Variable x at node i at timestep t |
| $\hat{x}$ | Future prediction for X |
| $\hat{x}^a$ | Future decision for X in scenario a |
| $\bar{x}$ | Realization of x |
| | Timesteps and Other Notation |
| t(k) | $k\Delta_{GC}$ timestep at which the GC runs update k |
| T | Last timestep in the investment horizon |
| $\Re(.)$ | Real component of complex number |
| $\Im(.)$ | Imaginary component of complex number |
| * | Complex conjugate |

Control Processes for Global and Local Controllers

Figure 7:
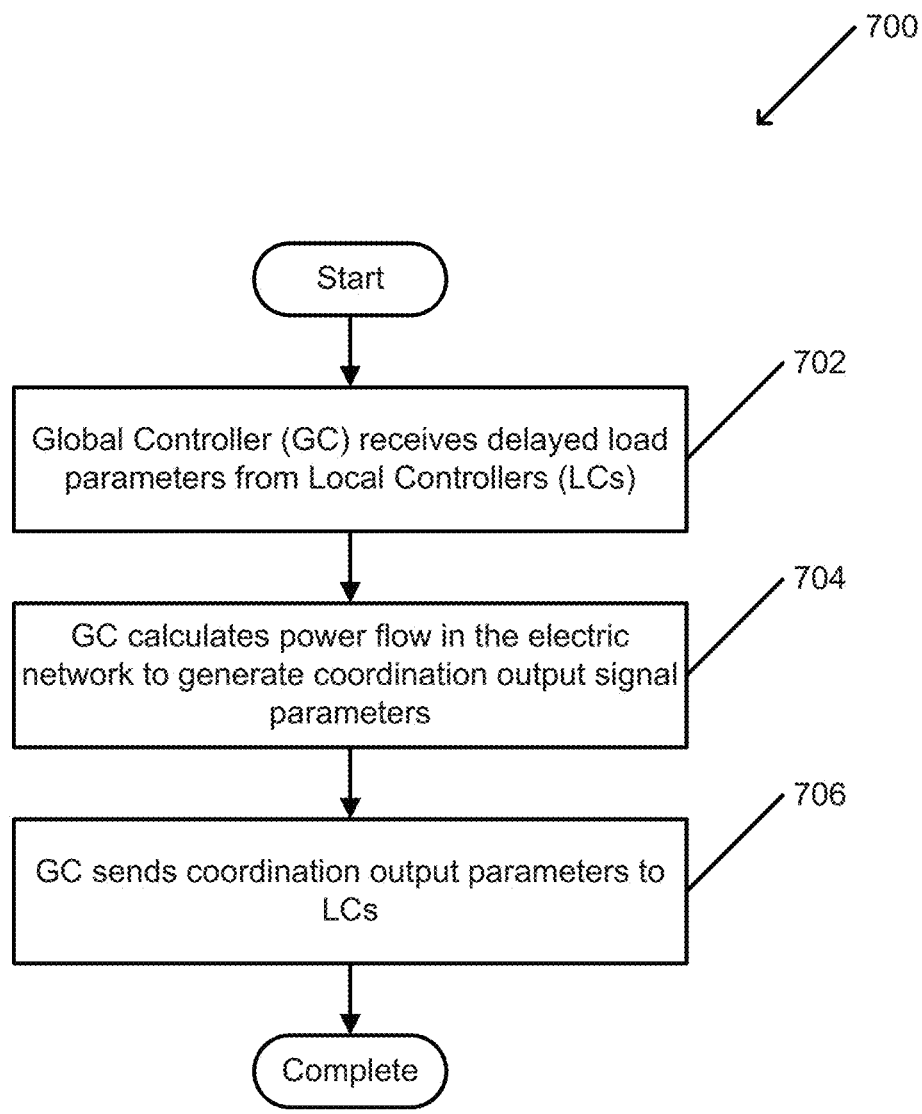
FIG. 7 is a flow chart illustrating a process for using a global controller to achieve distributed energy control within a power distribution network in accordance with an embodiment of the invention.

Coordination output parameters for nodes in power distribution networks to solve for distributed energy storage can be determined with various processes at global controllers in centralized computing systems. The global controllers can communicate with local controllers found at nodes. A process 700 that can be performed by a global controller to achieve distributed energy control within a power distribution network in accordance with an embodiment of the invention is illustrated in FIG. 7. In the illustrated process, the GC receives (702) delayed load parameters from LCs. In several embodiments, this delay can be caused by a variety of factors including (but not limited to) time load data takes to travel from the nodes to a centralized location and/or interruptions in data connectivity with nodes (such as but not limited to spotty wireless internet connections).

In several embodiments, the GC can be located in a centralized computing system and LCs can be located at nodes in a power distribution network as shown in FIG. 2. The GC calculates (704) power flow in the electric network to generate coordination output signal parameters. In several embodiments, coordination output signal parameters can include (but are not limited to) parameters to coordinate the control of loads such as (but not limited to) solar panels and/or local batteries at nodes across the network. A variety of processes can be utilized to calculate coordination output signal parameters including (but not limited to) direct storage control (DSC) processes, net loading following control (NLFC) processes, and/or nodal slack control (NSC) processes. A detailed discussion of DSC, NLFC, and NCS processes follows. GC transmits (706) coordination output signal parameters to LCs. A discussion of how LCs can use coordination output signal parameters to control their local storage at nodes is discussed below. Although solving for DES using coordinated control is described above with reference to FIG. 7, any of a variety calculations to solve for energy storage in a power distribution network can be utilized as appropriate to the requirements of specific applications in accordance with embodiments of the invention. Processes that can be utilized by local controllers to in distributed energy storage at nodes in a power distribution network utilizing a variety of calculations are discussed below.

Figure 8:
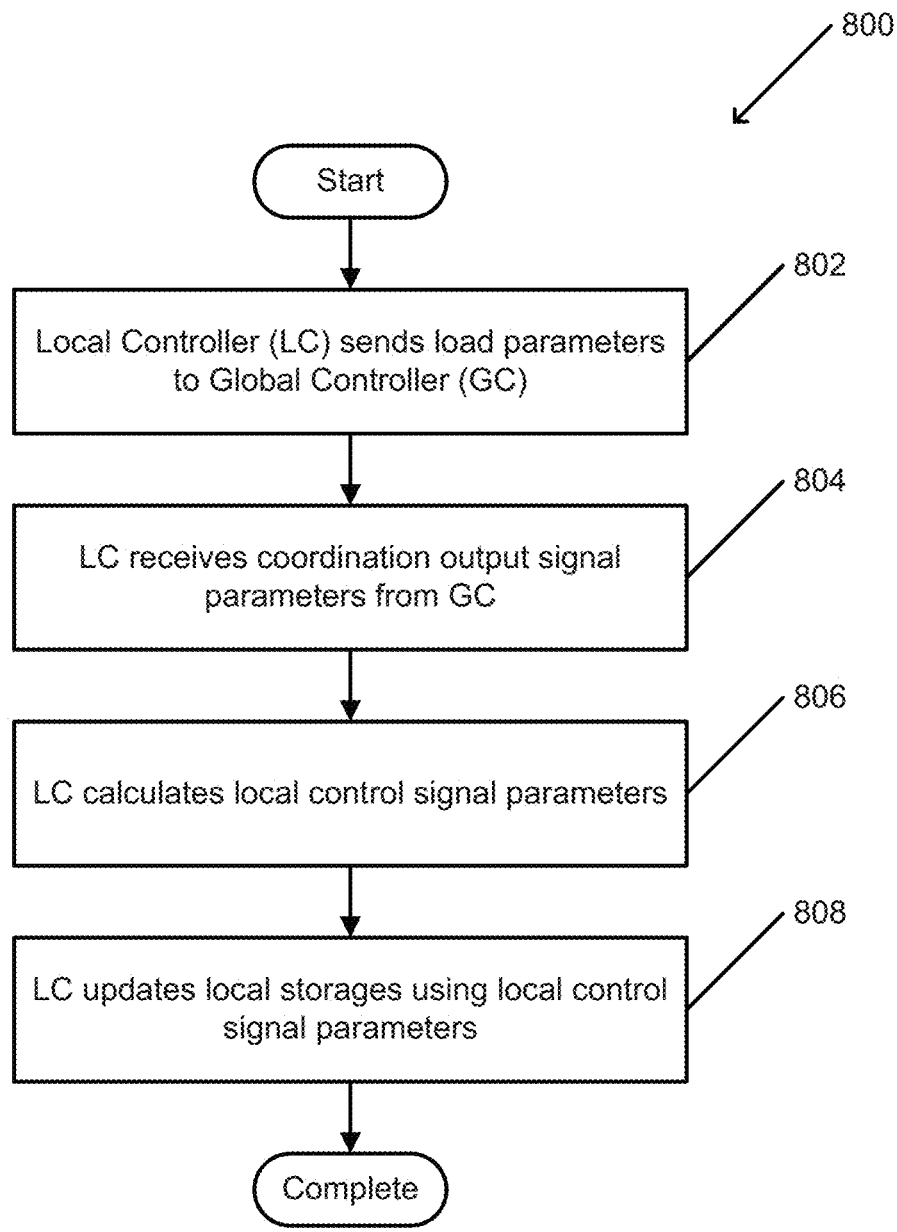
FIG. 8 is a flow chart illustrating a process for using a local controller to achieve distributed energy storage in accordance with an embodiment of the invention.

A process that can be performed by a local controller to achieve distributed energy storage using a variety of coordinated processes in accordance with an embodiment of the invention is illustrated in FIG. 8. The process 800 includes the LC transmitting (802) load parameters to the GC. Load parameters can include (but are not limited to) parameters that control solar panels and/or batteries connected at a node. In various embodiments, these load parameters can be received by the GC at a delay and/or buffered so that load parameters received from many LCs can be used at the same time. The LC receives (804) coordination output signal parameters from the GC. The calculation of coordination signal parameters is discussed above. Using the received coordination output signal parameters in additional to local parameters, the LC calculates (806) local control signal parameters. A variety of processes can be utilized to calculate local control signal parameters including (but not limited to) DSC processes, NLFC processes, and/or NSC processes. A detailed discussion of DSC, NLFC, and NCS processes follows. Additionally, local storages (including but not limited to local batteries and/or solar panels) can be updated (808) using local control signal parameters. Although adjusting load storages at nodes to achieve distributed energy storage is described with reference to FIG. 8, any of a variety of processes for local control of nodes within a power distribution network to achieve distributed energy storage can be utilized as appropriate to the requirements of specific applications in accordance with embodiments of the invention. Direct storage control processes to calculate distributed energy storage is described below.

Direct Storage Control Scheme

Figure 9:
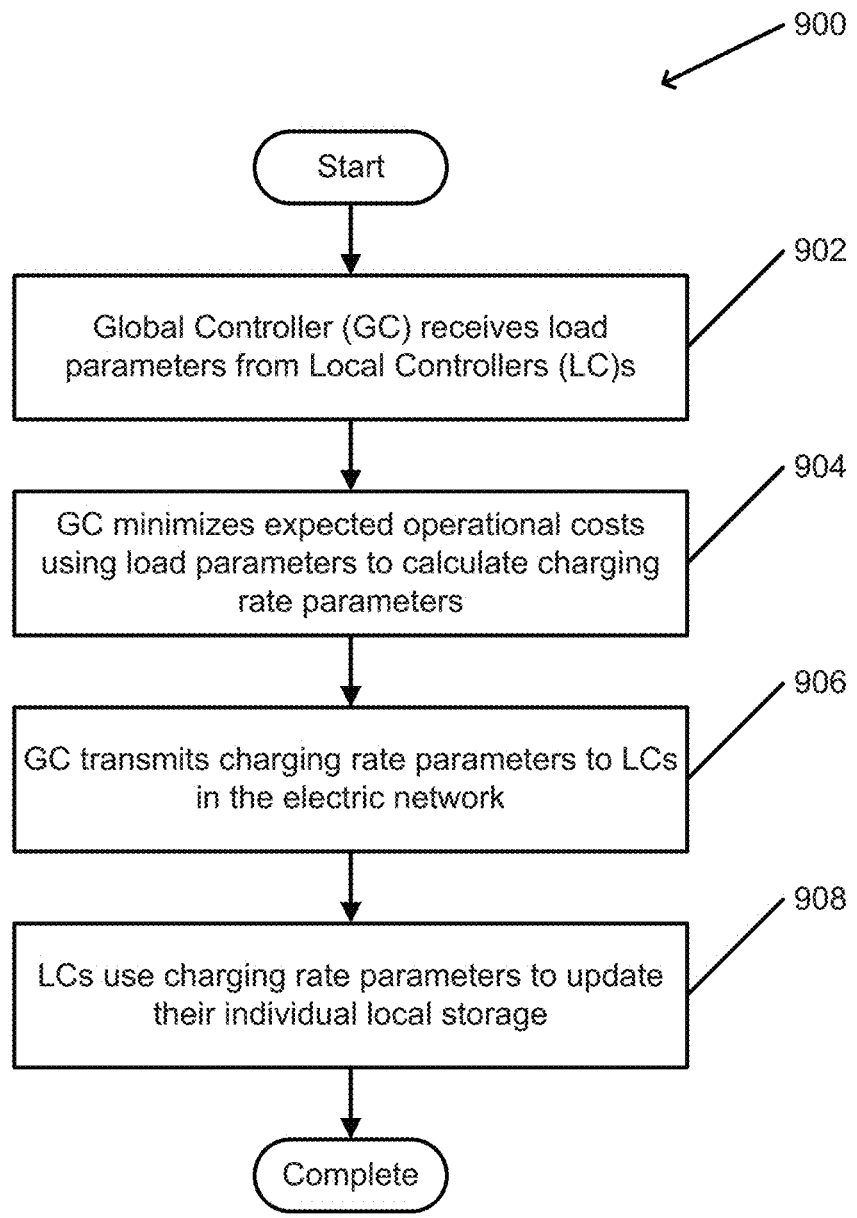
FIG. 9 is a flow chart illustrating a process for minimizing the expected operational costs to calculate distributed energy control in accordance with an embodiment of the invention.

A process that can minimize the expected operational costs to calculate distributed energy control in accordance with an embodiment of the invention is illustrated in FIG. 9. The process 900 includes the GC receiving (902) load parameters from LCs. In many embodiments, these load parameters are subject to a delay and/or buffer. The GC minimizes expected operational costs using load parameters to calculate (904) charging rate parameters. These calculations will be discussed in detail below. The GC transmits (906) charging rate parameters to LCs in the power distribution network. LCs can use charging rate parameters to update (908) their individual local storage. Although a variety of direct storage control processes are described with reference to FIG. 9, any of a variety of processes to calculate distributed energy control in a power distribution network can be utilized as appropriate to the requirements of specific applications in accordance with embodiments of the invention. Details of DSC processes are discussed below.

In the Direct Storage Control (DSC) scheme, the GC algorithm determines the charging schedule that minimizes the expected operational cost over set of A forecast scenarios, while ensuring that the network constraints are satisfied for all scenarios. Pseudocode that can be utilized to solve for optimal power flow using a direct storage control process in accordance with several embodiments of the invention is illustrated in FIG. 10. As detailed in FIG. 10, the GC runs at timesteps t(k) for k=1, . . . , T/$\Delta_{GC}$. For each solution, the forecast scenarios extend from the current hour t(k) to t(k+1)+$\Delta_F$, where $\Delta_F$ is included to discourage greedy solutions by considering the impact on subsequent iterations. The charging schedule over the window from t(k)+1 to t(k+1) is applied directly to the storage (i.e., the LC simply applies the GC output signals directly).

In some embodiments, an advantage of the DSC method is that the LC does not need to do any computation. The disadvantage is that the system does not leverage the more recent data that becomes available to the LC throughout the t(k)+1 to t(k+1) window.

Net Load Following Control Schemes

Figure 11:
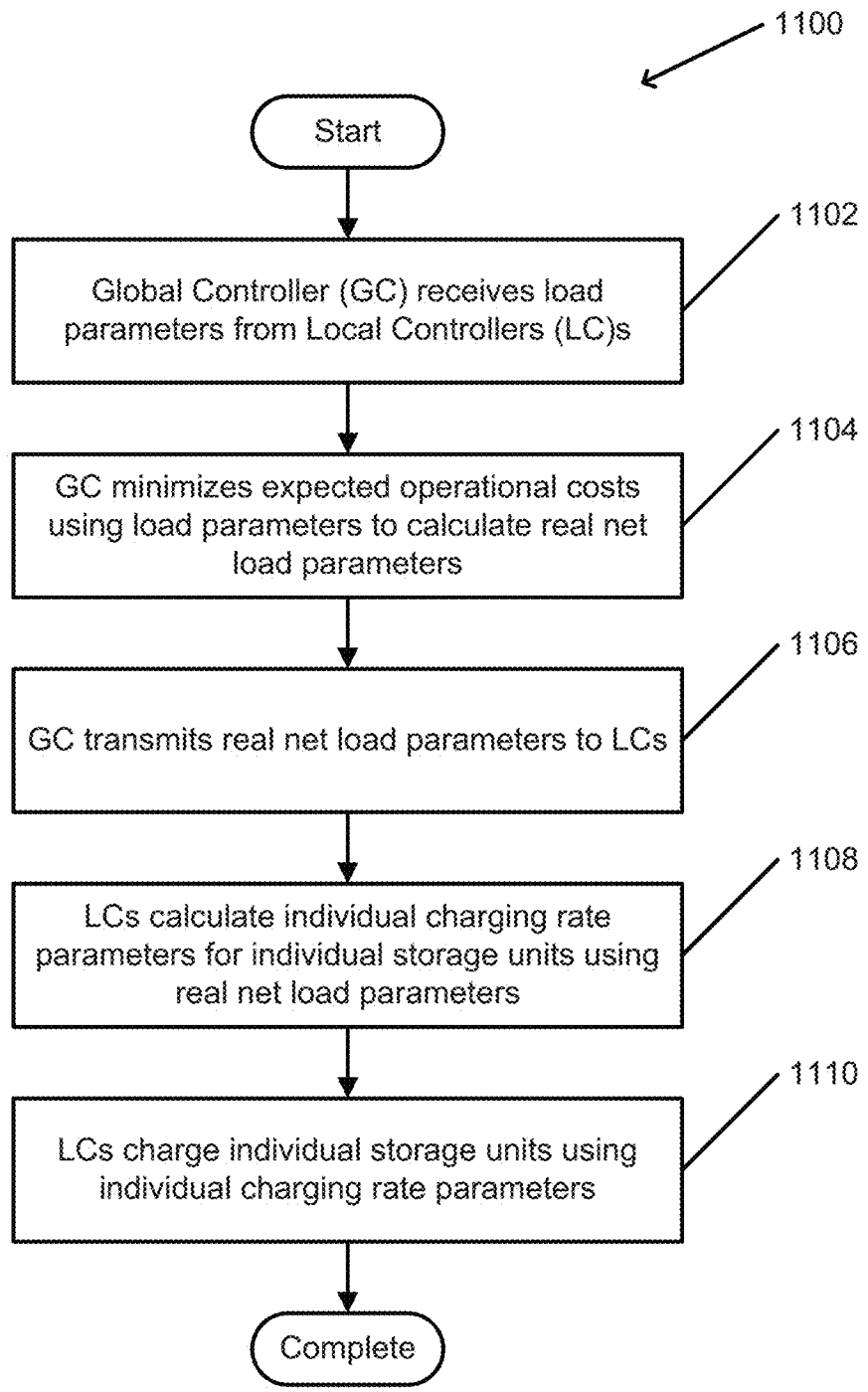
FIG. 11 is a flow chart illustrating a process for using varying storage at each node in a distributed power distribution network while calculating distributed energy control in accordance with an embodiment of the invention.

A process that uses varying storage at each node while calculating distributed energy control in accordance with an embodiment of the invention is illustrated in FIG. 11. The process 1100 includes the GC receiving (1102) load parameters from LCs. As previously discussed, these load parameters may be subject to a delay and/or a buffer. The GC minimizes expected operational costs using load parameters to calculate (1104) real net load parameters. These calculations will be discussed in detail below. Real net load parameters can be transmitted (1106) from the GC to the LCs. LCs can calculate (1108) individual charging rate parameters for their individual storage units using real net load parameters. These calculations will be discussed in detail further below. LCs charge (1110) individual storage units using individual charging rate parameters. In various embodiments, individual storage units can include (but are not limited to) solar panels and/or local batteries. Although a variety of net load following control processes are described with reference to FIG. 11, any of a variety of processes to calculate distributed energy control in a power distribution network can be utilized as appropriate to the requirements of specific applications in accordance with embodiments of the invention. Details of NFLC processes are discussed below.

In the Net Load Following Control (NLFC) scheme, the GC process allows the storage action at each node to vary across scenarios, while fixing the real net load. The output of the GC is now the real net load targets $\Re$(s) instead of the charging rates u. As before, the GC runs at timestep t(k) for each k=1, . . . , T/$\Delta_{GC}$.

Psuedocode that can be utilized to solve for optimal power flow utilizing a net load following control process in accordance with various embodiments of the invention is illustrated in FIGS. 12 and 13. Pseudocode that can be used with a GC process and a LC process are illustrated in FIGS. 12 and 13 respectively. Within each iteration of the GC algorithm, the LC runs at each timestep t∈[t(k)+1, . . . , t(k+1)], leveraging the output of the last GC execution at t(k) as well as updated forecasts. In each execution, the LC generates g∈[1, . . . , G] new load forecasts beginning at the current time t and extending to t(k+1)+$\Delta_F$.

In various embodiments, an advantage of the NLFC scheme can be that the LCs are able to leverage data not available to the GC. Furthermore as long as all LCs can match their real net load to the GC target, the power flow constraints of the network are satisfied. The downside of this approach is that the target real net loads sent by the GC may not be the only feasible ones, potentially resulting in lower arbitrage profits.

Nodal Slack Control Schemes

Figure 14:
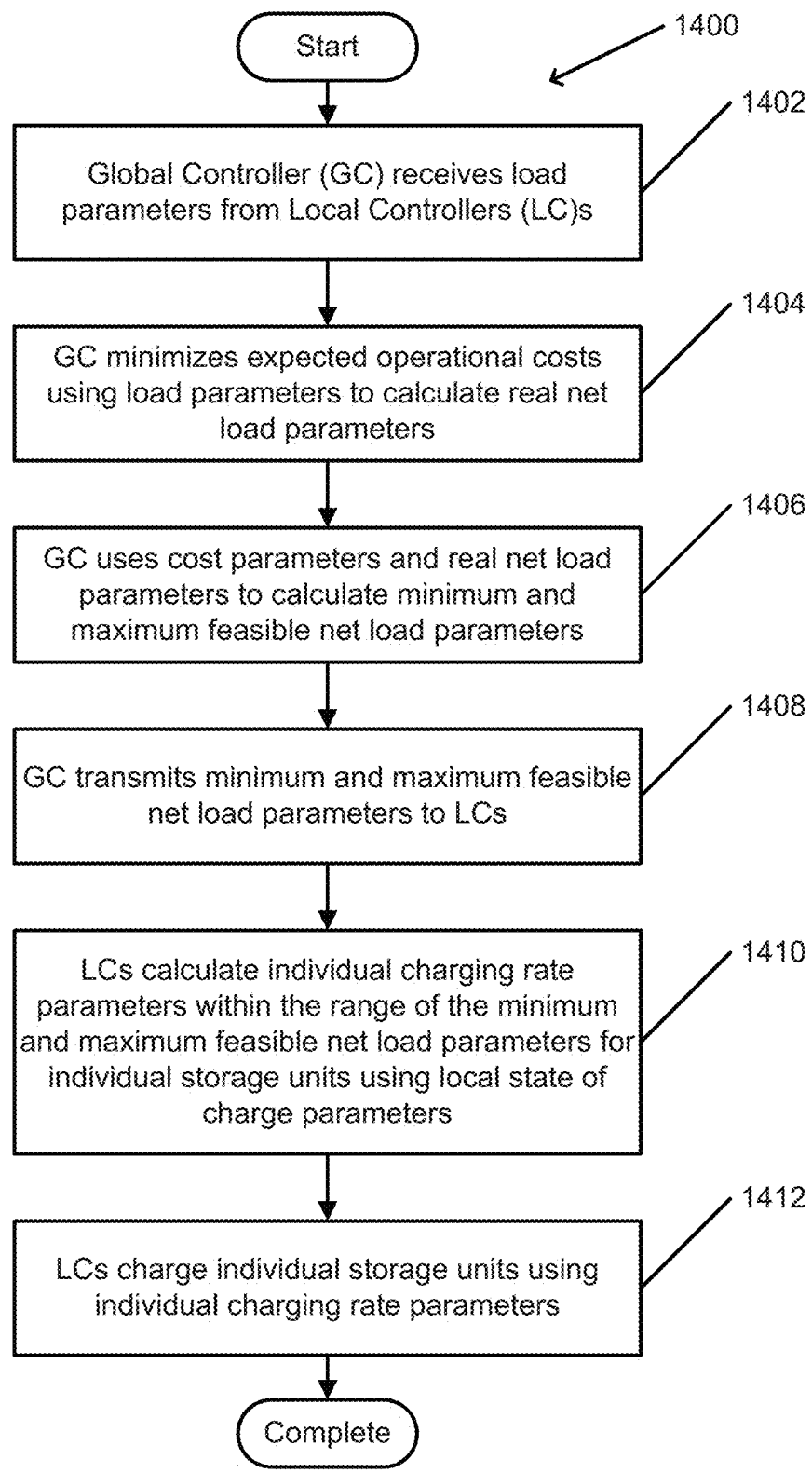
FIG. 14 is a flow chart illustrating a process for making changes to received target net loads based on local conditions at nodes in a power distribution network in accordance with an embodiment of the invention.

A process that can make changes to received target net loads based on local conditions at nodes in a power distribution network in accordance with an embodiment of the invention is illustrated in FIG. 14. The process 1400 includes GC receiving (1402) load parameters from LCs. As previously discussed, these load parameters my be subject to a delay and/or buffered. The GC can minimize expected operational costs using load parameters to calculate (1404) real net load parameters. Cost parameters and real net load parameters can be used to calculate (1406) minimum and maximum feasible net load parameters. These calculations will be discussed in detail below. In various embodiments, minimum and maximum feasible net load parameters indicate how far from the real net load a LC can deviate without causing problems in the system. The GC transmits (1408) minimum and maximum feasible net load parameters to LCs. In many embodiments, LCs can calculate (1410) individual charging rate parameters within the range of the minimum and maximum feasible net load parameters for their individual storage units based on the local state of charging parameters. These calculations will be discussed in detail below. LCs charge (1412) individual storage units using individual charging rate parameters. Although a variety of nodal slack control processes are described with reference to FIG. 14, any of a variety of processes to calculate distributed energy control in a power distribution network can be utilized as appropriate to the requirements of specific applications in accordance with embodiments of the invention. Details of NSC processes are discussed below.

Intuitively, the NLFC scheme makes sense when all network constraints in the GC optimization are tight, i.e., when small changes to the target real net loads result in voltage violations. In many scenarios, however, the LCs may be able to move significantly from the GC targets without causing any violations, which may provide additional benefits such as increased arbitrage profit. This motivates the Nodal Slack Controller (NSC) scheme, which places target bounds on the real net loads rather than a single target and introduces arbitrage as an objective in the LC optimization algorithm.

Pseudocode that can be utilized to solve for optimal power flow using a nodal slack control scheme in accordance with several embodiments of the invention is illustrated in FIGS. 15 and 16. Pseudocode that can be used with a GC process is illustrated in FIG. 14. and a LC process are illustrated in FIGS. 14 and 15 respectively. Denote by $x_{jt}^+$ and $x_{jt}^-$ the maximum and minimum feasible real net load at node j at time t, respectively, assuming that the real net loads for all other nodes i≠j can be set by the output of a NLFC process similar to a NLFC process described above with respect to FIGS. 11-13. Let the real net load of the root node and node j remain as variables and optimize the injection at node j to obtain upper and lower bounds on the net load at node j such that all voltage constraints in the network are satisfied. Storage dynamics and constraints are not included as the net load bounds are determined for each time period independently. These computations are setup as arbitrage optimizations for convenience. In each arbitrage optimization, the storage dynamics and constraints are dropped. The root node can purchase energy at the market price and node j can buy or sell energy at higher prices than the market (the magnitude of the higher price does not matter here). The solution increases the flow to node j until it reaches a network constraint. The new real net load is $x_{jt}^+$. Similarly, $x_{jt}^-$ can be found by introducing an arbitrage in the opposite direction. In practice, the process can be sped up by computing only the target bounds for nodes that can realistically introduce network violations. These nodes can be identified from previous GC outputs.

Similarly, pseudocode that can be used with a LC process is illustrated in FIG. 15. At each timestep t, each LC generates g=1, . . . , G new forecasts for their own loads. Each LC ensures that all G scenarios generate a feasible flow under the target bounds. The resulting charging decisions for the first timestep are executed, and the process is repeated until the next GC output is received.

Simulated Results

In this section, control schemes in accordance with various embodiments are compared and the effect of communication delay on their performance using the 56-bus radial distribution feeder model is evaluated using a 56-bus radial distribution feeder model described further below and illustrated in FIGS. 23 and 24. Pseudocode for a process which can be used for RDG and storage placement in a network is illustrated in FIG. 22 and additionally is described in detail further below. Additionally, the load and RDG forecasting models which can be used to generate simulated loads is decried further below.

In several embodiments, throughout the simulation, the optimization parameters can be set to be $\delta_{min}$=1 hour, A=25, G=10, $\Delta_F$=48 hours. The storage parameter can be set as λ=0.9 constraints can not be imposed on $u_i^{min}$ or $u_i^{max}$, that is, the storage is limited only by its capacity constraints and not by charging or discharging rate limits. The capacity constraints are based on storage penetration and are described further below. Each simulation can be performed over an analysis horizon of 30 days (T=720 hours). In many embodiments, configurations of the radial network can be created with different storage and RDGs penetrations using the placement method described further below.

The network storage penetration can be denoted by x, and defined as the total capacity of all storage divided by the average daily energy use of the network. The network RDG penetration can be denoted by y and defined as the average RDG output divided by the average load in the network. The variable z will represent either the PFOSC benchmark or one of the control schemes DSC, LFLC, or NSC.

In planning a real world installation, x and y can be varied for a chosen control scheme z to minimize the aggregate capital and operational costs of the energy grid. In order to perform this analysis, however, the capital costs of solar and storage, useable lifetime of devices, discount rates, and compensation rates for solar and storage back feeding (which likely differ from wholesale energy prices) would need to be known. Since the focus here is on comparing the efficacy of the control schemes and how their performance depends on communication delay, two metrics can be introduced which characterize the performance of the storage controllers independent of these factors:

Highest RDG Penetration. This is the highest achievable RDG penetration ŷ(x, z, $\Delta_{GC}$) for a given storage penetration x, control scheme z, and communication delay $\Delta_{GC}$ such that Process 6 as illustrated in FIG. 17 returns True. The penetration measured by the algorithm is the supported RDG such that network constraints are violated at a maximum of 1 hour out of 3600 operating hours, giving a reliability of 99.98%.

Normalized Arbitrage Profit. In addition to supporting RDGs by alleviating local network constraints, the storage can also reduce the operational cost of the network by shifting the aggregate load from peak to off peak hours. Denote by ARB(x,y,z,$\Delta_{GC}$) the total realized battery operating profit (arbitrage) for a given network with storage penetration x, RDG penetration y, under control method z, with communication delay $\Delta_{GC}$, i.e., $$ARB(x, y, z, \Delta_{GC}) = \sum_{(i,t)} p_t \cdot u_{it}. \qquad (3)$$

The objective of maximizing ARB may conflict with achieving the highest RDG support because storage may need to charge during a peak price hour in order to avoid a constraint violation caused by RDG. Hence, the realized arbitrage can be normalize by the arbitrage realized in the system with the same storage and RDG penetration operated using the PFOSC ($\Delta_{GC}$ is not relevant in PFOSC), i.e., $$\overline{ARB}(x, y, z, \Delta_{GC}) = \frac{ARB(x, y, z, \Delta_{GC})}{ARB(x, y, PFOSC, 0)}. \qquad (4)$$

FIG. 17 illustrates pseudocode for process 6 which can be used to evaluate the distributed control schemes based on the above metrics.

Figure 18:
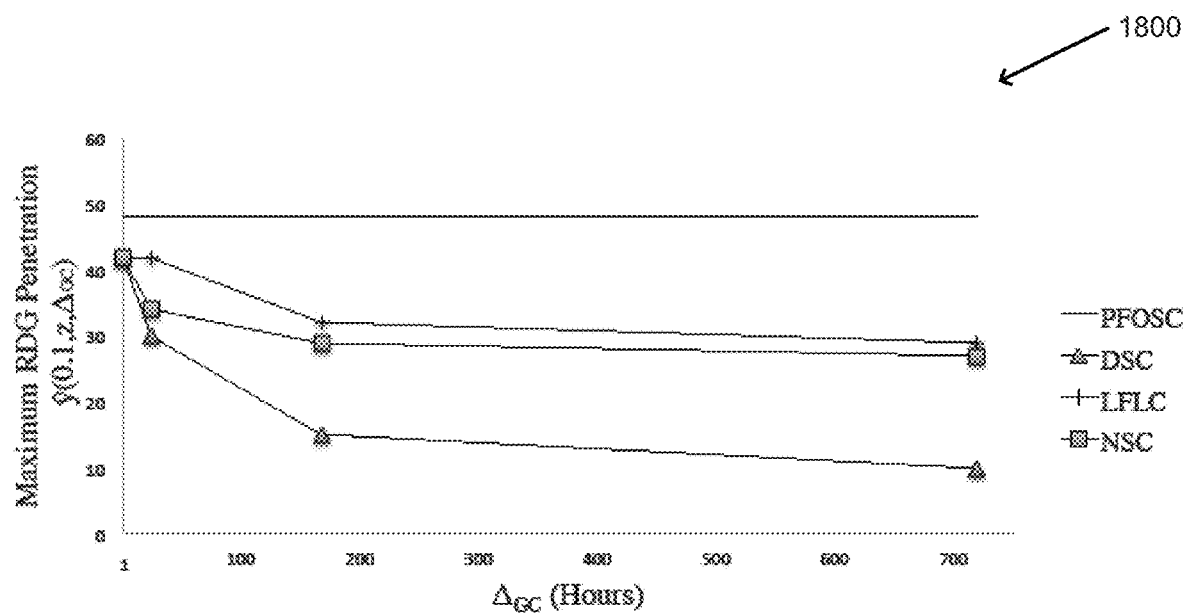
FIG. 18 is a plot illustrating the highest RDG penetration for storage penetration x=10% as a function of the delay $\Delta_{GC}$ in accordance with an embodiment of the invention.

First the impact of communication delay can be explored on the highest RDG penetration for the three control schemes. FIG. 18 plots the highest RDG penetration for storage penetration x=10% as a function of the delay $\Delta_{GC}$ for the three control schemes. It can be observed see that the highest RDG penetration for all LC control schemes is the same when the GC updates every timestep, i.e., when $\Delta_{GC}$=1. As $\Delta_{GC}$ is increased, the highest RDG support degrades for all control schemes. This is expected as load forecasting errors increase, and thus network violations are more likely to occur. The degradation for the LFLC and NSC methods is significantly less than using the DSC since they use the local data in performing the control.

To quantify the value of coordination to RDG penetration, the maximum RDG penetration can be computed at the highest of amount of coordination corresponding to running GC every hour ($\Delta_{GC}$=1) and compare it to the least amount of coordination corresponding to running GC once ($\Delta_{GC}$=T=720). Note that from FIG. 18 that RDG penetration drops from 42% to 29% for the LFLC, to 27% for the NSC and to 10% for the DSC (with fixed schedule and no local control). Thus, different control schemes can achieve significantly different values for coordination and in particular NSC performs very similarly to LFLC.

Figure 19:
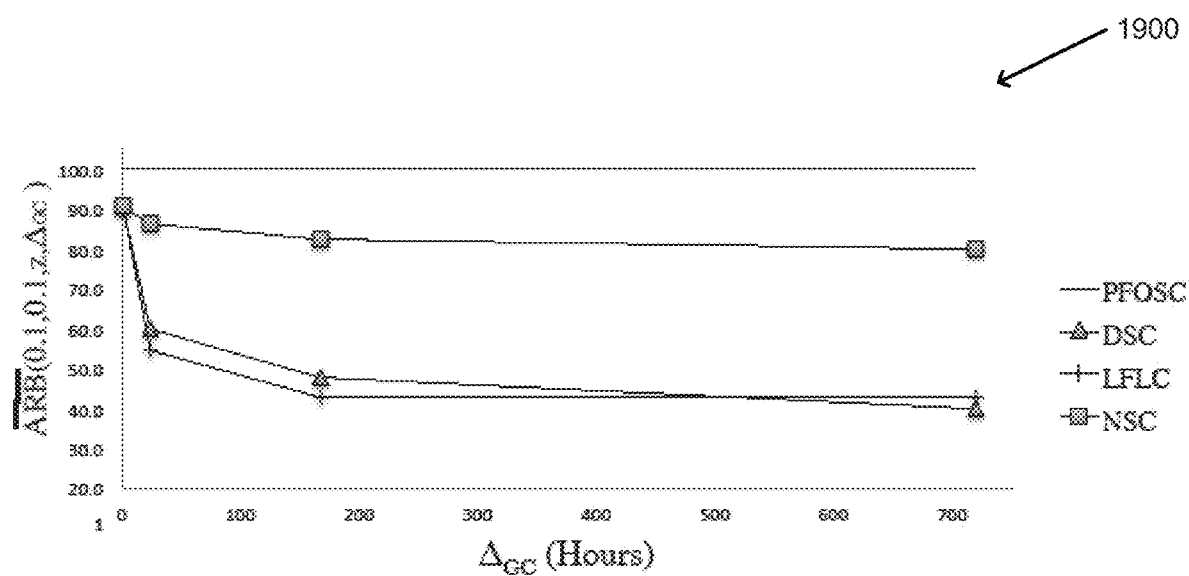
FIG. 19 is a plot illustrating normalized arbitrage profits for storage penetration x=10% and RDG penetration y=10 in accordance with an embodiment of the invention.

Next, the impact of communication delay on arbitrage profits can be explored. FIG. 19 plots the normalized arbitrage profits for storage penetration x=10% and RDG penetration y=10%. It can be seen that the degradation in arbitrage profit with delay is much lower for the NSC scheme than the other two control schemes because the local objective of the NSC controller directly accounts for arbitrage profits. To quantify the value of coordination to arbitrage profit, note that from FIG. 19 the maximum normalized arbitrage profit at $\Delta_{GC}$=1 is 90.7%, while at $\Delta_{GC}$=T=720 it drops to around 40% for DSC and LFLC but only to 80% for the NSC. In terms of the value of coordination to arbitrage profits NSC significantly outperforms the DSC and LFLC.

Figure 20:
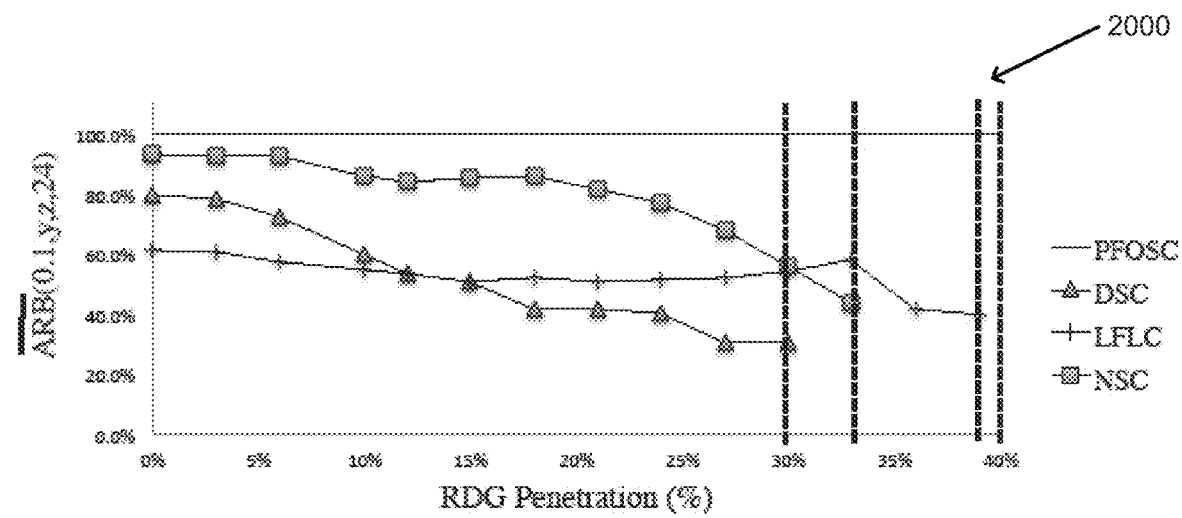
FIG. 20 is a plot illustrating the arbitrage profits versus the RDG penetration for three control schemes for $\Delta_{GC}$=24 and storage penetration x=10% in accordance with an embodiment of the invention.

To explore the impact of RDG penetration on arbitrage profits in FIG. 20, the arbitrage profits versus the RDG penetration for the three control schemes can be plotted for $\Delta_{GC}$=24 and storage penetration x=10%. Each plot ends at the maximum RDG penetration achievable by the corresponding control scheme. It can be seen that the arbitrage profit degrades as RDG penetration increases, and that the rate of degradation increases as the maximum RDG penetration is approached. The NSC scheme performs best in limiting the degradation for a given RDG penetration except at the highest penetration levels. The LFLC scheme is able to support higher RDG penetration levels for the chosen $\Delta_{GC}$. For higher values of delay, the NSC scheme significantly outperforms LFLC in capturing arbitrate profits as noted earlier.

Optimal Control of Storage

Systems and methods in accordance with various embodiments of the invention can address the optimal control of storage simultaneously considering realistic cyber and physical constraints. In doing so, the distributed control systems are constructed in view of the operational reality that load information is often only available to a global controller with some time delay due to communications limitations in the metering infrastructure. Even in the absence of such limitations, it can be unrealistic to expect real-time availability of local information in large distribution networks. In many embodiments, the control schemes that utilize local information can perform significantly better than those that do not. The benchmark utilized is the DSC that prescribes the optimal control strategy from delayed information without accounting for the possibility of local updates. The DSC performs significantly worse than two strategies that utilize local information: the nodal slack controller (NSC) and the load following local controller (LFLC). LFLC assumes that following the strategy based on forecasted loads is optimal whereas NSC shifts more responsibility for control decisions to the local control scheme. In practice, NSC significantly outperforms LFLC when the information delay increases. LFLC supports up to 40% RDG penetration while NSC supports only up to 29% but captures a significantly higher percentage of arbitrage profits as compared to LFLC, especially when RDG penetrations are high. It would be straightforward to combine both the NSC and LFLC controllers into a controller that achieves a tradeoff between maximum RDG penetration and arbitrage profits not achievable by either controller alone.

In realistic scenarios there is a tradeoff between maximum RDG penetration and the achievable arbitrage profits for each proposed control scheme. An appropriate choice of the control scheme can make the whole system robust to the information delay. For example, it can be observed that as the information delay is greater than 1 hour, the degradation in renewable RDG penetration is small if either LFLC or NSC is utilized. Furthermore, higher arbitrage profits require shifting more control flexibility to the local controller as the communication delay increases. The NSC scheme therefore achieves a better overall tradeoff as compared to LFLC and DSC. As can readily be appreciated, embodiments of the invention are not limited to these two strategies and other strategies that utilize local information and are appropriate to the requirements of a given application can be utilized.

Network Topology

Figure 23:
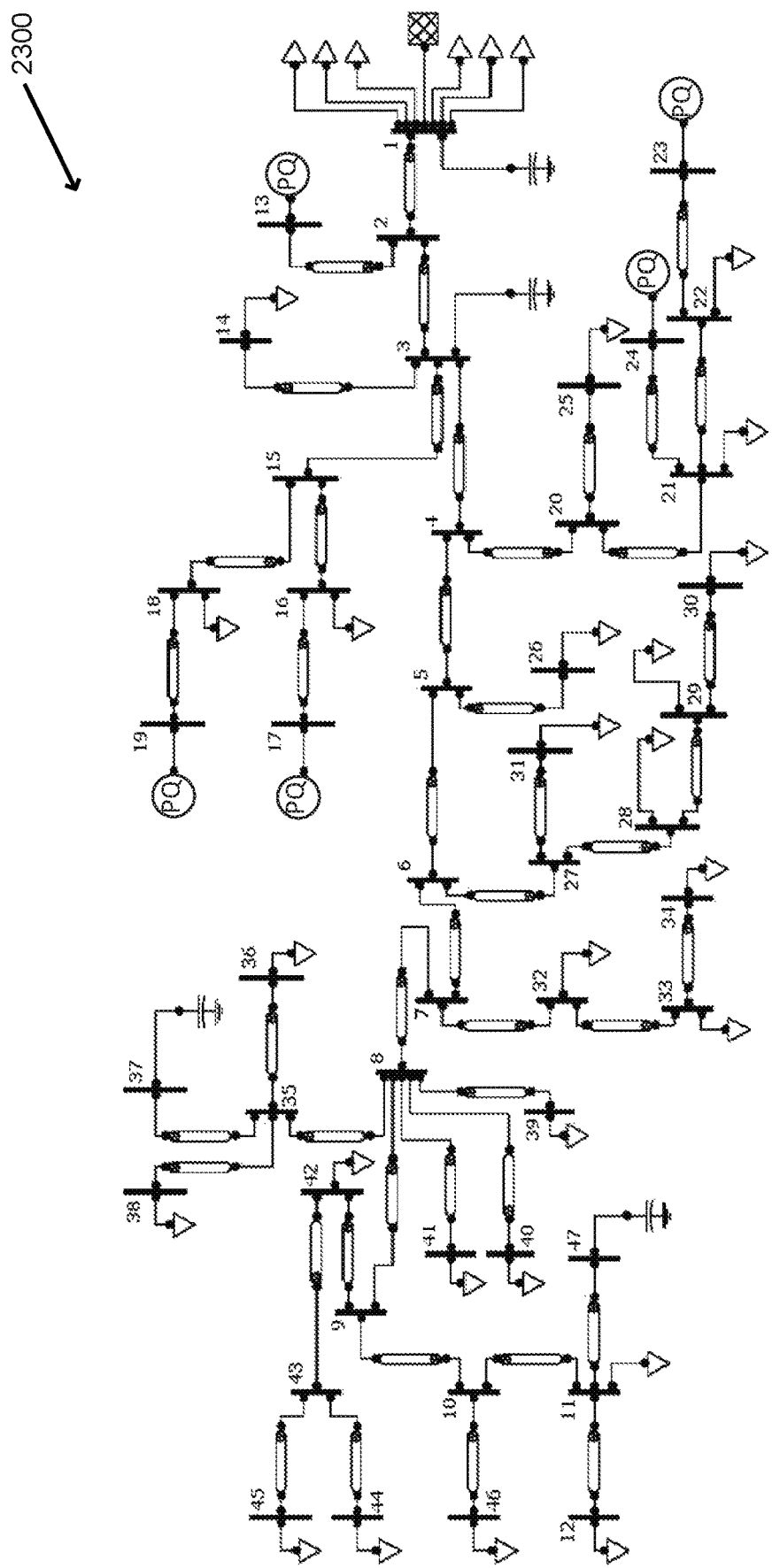
FIG. 23 is a circuit diagram for a radial distribution model that can be utilized in the development of distributed control systems in accordance with an embodiment of the invention.

A radial distribution model that can be utilized in the development of distributed control systems in accordance with various embodiments of the invention is depicted in FIG. 23. The resistance and reactance values for each line in the circuit are given in FIG. 24. These values define the admittance values used in our controllers throughout the paper ($y_{ij}$=1/($R_{ij}$+i$X_{ij}$)). A static configuration for voltage regulators in this network can be selected, which makes the network constraints more stringent since violations cannot be corrected by volt/var equipment. The full model specification can also involve defining the load and solar PV time series at each bus in the network and is addressed further below.

Load Placement

To define a load time series for each bus, smart meter data for 55 residential customers collected over one year in a pilot program located in the Central Valley region of California can be utilized. The original data includes 15 minute measurements of power consumption, temperature, humidity, and the context of the reading (day of week, time of day, holidays). The data can be down-sampled to one hour intervals by summing the data points for each hour.

Each bus in the network model corresponds to aggregates of customers behind secondary transformers. These aggregates can be constructed by choosing customers uniformly at random with replacement and assigning them to buses. Customers can be continuously added to a given bus until the average daily peak load for that bus matches the peak loads given in FIG. 24.

RDG and Storage Placement

The RDG dataset used is obtained from the solar PV output data reported in a 2006 NREL study, which provides estimated time series of solar PV production based on solar irradiance and temperature.

RDG and storage are placed using a process illustrated in FIG. 22. A fraction of nodes y % is selected within the network at random. Each selected bus receives solar and storage in a proportion weighted by the rated load of the bus, such that the total storage and solar on the network matches our target allocation.

Net Load Forecasting

Simulations in accordance with many embodiments of the intention involve multiple scenarios for the behavior and forecasting of loads in order to compute a robust estimate of performance. The ARIMA model can be utilized with the form $(3,0,3)(3,0,3)_{24}$ to fit the load data generated in the previous section and serve as a basis for scenario generation. A seasonal differencing of 24 can be chosen to represent the daily periodic trends that exist in the load data. The resulting ARIMAX model is $$(1-\phi_1 B-\phi_2 B^2-\phi_3 B^3)(1-\phi_{24}B^{24}-\phi_{48}B^{48}-\phi_{72}B^{72})(1-B^{24})x_t=(1+\theta_1 B+\theta_2 B^2 \theta_3 B^3)$$

$$(1+\theta_{24}B^{24}+\theta_{48}B^{48}+\theta_{72}B^{72})\epsilon_t,$$

$$\epsilon_t \sim \mathcal{N}(0,1), \quad (5)$$

with the variables in Table 2.

TABLE 2

Constants and variables used in the ARIMAX Model.

| Data | |
| --- | --- |
| $x_t$ | load or rdg at time t |
| Model Coefficients | |
| $\phi$ | autoregressive coefficients |
| $\theta$ | moving average coefficients |
| Other | |
| $\epsilon_t$ | Gaussian error term |
| B | Lag operator. (i.e., $B^1 y_t = y_{t-1}$) |

Figure 21:
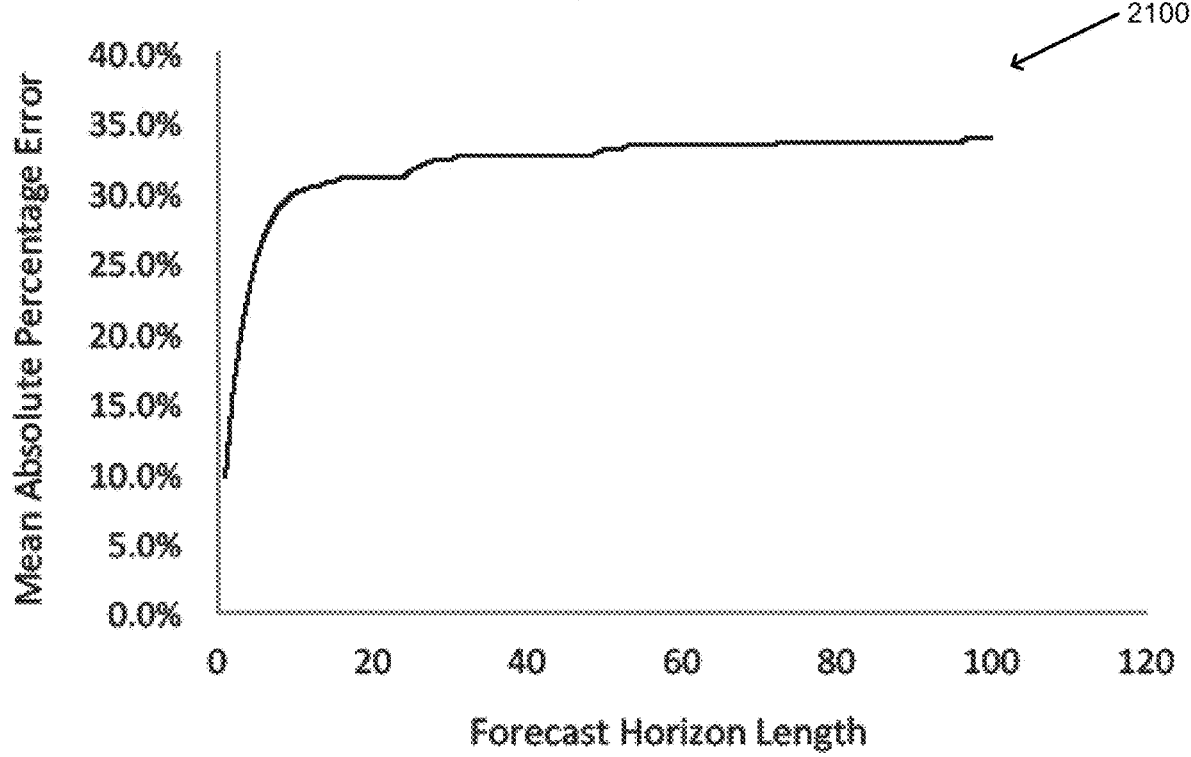
FIG. 21 is a plot illustrating forecast error as a function of time in accordance with an embodiment of the invention.

The $\phi$ and $\theta$ values can be used that maximize the likelihood of the load data. After the model is fitted, a single forecast estimate for a one hundred hour long interval is determined and assigned as the reference hourly load. A=50000 other sample scenarios can be generated by drawing random variables for $\epsilon_t$, and sequentially applying them to the model in (5). The mean average percentage error over the forecasts is defined as $$MAPE(t) = \frac{1}{A}\sum_{a=1}^{A}\frac{|\bar{x}_t - \hat{x}_{it}^a|}{\bar{x}_t}, \quad (6)$$

where $\bar{x}_t$ is the reference hourly load and $\hat{x}_{it}^a$ is a prediction in scenario a. FIG. 21 plots the forecast error as a function of time. As expected, the forecast error increases as forecasts are made further into the future since less data is available. Accordingly, GC has a less accurate forecast of future load than the LCs, due to the delays in the network and the limitations on how frequently the GC runs.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like advantageous, exemplary or preferred indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A power distribution network, comprising:
    a set of nodes, wherein a node comprises a controllable load, an uncontrollable load, and a local controller, where the local controller is configured to transmit information to a global controller;
    a power substation connected to each node in the set of nodes by a set of power distribution lines; and
    the global controller, comprising: a processor, a memory, and a communications device, where the global controller is configured to communicate with local controllers via the communications device;
    where in order to attempt to maintain optimal power flow in the distribution network by coordinating the nodes, the global controller:
        obtains load parameters from at least one node in the set of nodes via the local controller of the at least one node;
        calculates real net load parameters that minimize expected operations costs using the load parameters;
        calculates coordination parameters comprising minimum and maximum feasible net load parameters using cost parameters and the real net load parameters;

asynchronously provides the coordination parameters comprising the minimum and maximum feasible net load parameters for each node to each respective given node in the set of nodes; and wherein each node independently:

obtains its coordination parameters comprising the minimum and maximum feasible net load parameters from the global controller; and calculates, using the local controller, individual charging rate parameters within the range of the minimum and maximum feasible net load parameters for individual storage units based on a local state of charging parameters;

charge, using the local controller, individual storage units using individual charging rate parameters.

2. The power distribution network of claim 1, wherein the set of nodes are connected to the power substation using a radial network topology.

3. The power distribution network of claim 1, wherein at least one node in the set of nodes further comprises a storage battery.

4. The power distribution network of claim 3, wherein the at least one node comprising a storage battery calculates local storage parameters based on condition parameters; and the local controller for each of the at least one node causes power generated by the controllable load to be stored using the storage battery according to the local storage parameters.

5. The power distribution network of claim 1, wherein at least one controllable load comprises a solar panel array.

6. The power distribution network of claim 5, wherein the at least one node comprising the solar panel array calculates local storage parameters based on condition parameters; and the local controller for each of the at least one node controls the operation of the solar panel array based on the local storage parameters.

7. The power distribution network of claim 1, wherein at least one controllable load comprises a power generator.

8. The power distribution network of claim 1, wherein:

the global controller calculates the coordination parameters by forecasting an optimal power flow based on delayed net load data; and each local controller utilizes the coordination parameters as a control signal for controlling the operation of the controllable load.

9. The power distribution network of claim 1, wherein:

the global controller calculates the coordination parameters by forecasting a net load profile for each node in the set of nodes at a plurality of timestamps; and each local controller utilizes the coordination parameters as a control signal for controlling the operation of the controllable load at each timestamp provided in the coordination parameters for the specific node having the local controller.

10. A method for controlling a power generation network, comprising:

obtaining load parameters from at least one node in a set of nodes using a global controller via a local controller of the at least one node, wherein:

each node in the set of nodes comprises a controllable load, an uncontrollable load, and a local controller; and the global controller comprises a processor, a memory, and a communications device;

calculates real net load parameters that minimize expected operations costs using the load parameters;

calculates coordination parameters comprising minimum and maximum feasible net load parameters using cost parameters and the real net load parameters;

asynchronously providing the coordination parameters comprising the minimum and maximum feasible net load parameters for each node to respective given node in the set of nodes using the global controller;

obtaining coordination parameters comprising the minimum and maximum feasible net load parameters from the global controller using each local controller for each respective given node in the set of nodes; and calculating, using each local controller for each node in the set of nodes, individual charging rate parameters within the range of the minimum and maximum feasible net load parameters for individual storage units based on a local state of charging parameters;

charging, using each local controller for each node in the set of nodes, individual storage units using individual charging rate parameters.

11. The method for controlling a power generation network of claim 10, wherein the set of nodes are connected to using a radial network topology.

12. The method for controlling a power generation network of claim 10, wherein at least one node in the set of nodes further comprises a storage battery.

13. The method for controlling a power generation network of claim 12, further comprising:

calculating local storage parameters based on condition parameters; and storing power generated by the controllable load using the storage battery according to the local storage parameters.

14. The method for controlling a power generation network of claim 10, wherein at least one controllable load comprises a solar panel array.

15. The method for controlling a power generation network of claim 14, further comprising:

calculating local storage parameters based on condition parameters; and controlling the operation of the solar panel array based on the local storage parameters using the local controller.

16. The method for controlling a power generation network of claim 10, wherein at least one controllable load comprises a power generator.

17. The method for controlling a power generation network of claim 10, further comprising:

calculating the coordination parameters by forecasting an optimal power flow based on delayed net load data using the global controller; and utilizing the coordination parameters as a control signal for controlling the operation of the controllable load using each local controller for each node in the set of nodes.

18. The method for controlling a power generation network of claim 10, further comprising:

calculating the coordination parameters by forecasting a net load profile for each node in the set of nodes at a plurality of timestamps using the global controller; and utilizing the coordination parameters as a control signal for controlling the operation of the controllable load at each timestamp provided in the coordination parameters for the specific node using the local controller for each node in the set of nodes.

* * * * *